(12) United States Patent
Inoue et al.

(10) Patent No.: US 9,534,552 B2
(45) Date of Patent: Jan. 3, 2017

(54) EXHAUST PURIFICATION SYSTEM OF SPARK IGNITION TYPE INTERNAL COMBUSTION ENGINE

(75) Inventors: Mikio Inoue, Susono (JP); Kohei Yoshida, Gotenba (JP); Yuki Bisaiji, Mishima (JP); Kenji Sakurai, Gotenba (JP); Kohki Nakamura, Ebina (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 14/423,713

(22) PCT Filed: Aug. 28, 2012

(86) PCT No.: PCT/JP2012/071693
§ 371 (c)(1),
(2), (4) Date: Apr. 2, 2015

(87) PCT Pub. No.: WO2014/033836
PCT Pub. Date: Mar. 6, 2014

(65) Prior Publication Data
US 2015/0240733 A1 Aug. 27, 2015

(51) Int. Cl.
*F01N 3/00* (2006.01)
*F02D 41/02* (2006.01)
(Continued)

(52) U.S. Cl.
CPC ......... *F02D 41/0295* (2013.01); *F01N 3/0253* (2013.01); *F01N 3/101* (2013.01);
(Continued)

(58) Field of Classification Search
CPC .... F01N 3/0842; F01N 13/02; F02D 41/0275; F02D 41/1441; F02D 41/0295
(Continued)

(56) References Cited

U.S. PATENT DOCUMENTS

| 6,220,018 B1 * | 4/2001 | Yamanashi ......... B01D 53/944 60/285 |
| 2012/0131908 A1 | 5/2012 | Bisaiji et al. |
| 2015/0152769 A1 * | 6/2015 | Aoki .................. F02D 41/0235 73/114.75 |

FOREIGN PATENT DOCUMENTS

| JP | 11081994 A | * | 3/1999 |
| JP | 2003049685 A | * | 2/2003 |

(Continued)

OTHER PUBLICATIONS

Machine Translation of JP 2007-046494, Translated on Nov. 10, 2015.*

*Primary Examiner* — Patrick Maines
(74) *Attorney, Agent, or Firm* — Finnegan, Henderson, Farabow, Garrett & Dunner, LLP

(57) ABSTRACT

A three-way catalyst (20) having an oxygen storage function and an exhaust purification catalyst (22) are arranged in the exhaust passage of an internal combustion engine. During medium-load operation of the engine the degree of lean of the air-fuel ratio in the combustion chamber (5) is increased so as to increase the oxygen storage amount of the three-way catalyst (20) to the maximum oxygen storage amount, and the air-fuel ratio in the combustion chamber (5) even after the oxygen storage amount of the three-way catalyst (20) has reached the maximum oxygen, storage amount is maintained at lean, after which the air-fuel ratio is returned to rich, and at this time, as the amount of poisoning of a noble metal catalyst when the air-fuel ratio in the combustion chamber (5) is rich increases, the amount of time for which the air-fuel ratio in the combustion chamber (5) is maintained at lean is increased.

8 Claims, 20 Drawing Sheets

(51) Int. Cl.
   *F01N 3/10* (2006.01)
   *F01N 9/00* (2006.01)
   *F01N 3/20* (2006.01)
   *F01N 3/025* (2006.01)
   *F02D 41/14* (2006.01)

(52) U.S. Cl.
   CPC ............... *F01N 3/20* (2013.01); *F01N 9/00* (2013.01); *F01N 9/002* (2013.01); *F02D 41/0275* (2013.01); *F01N 2430/06* (2013.01); *F01N 2610/03* (2013.01); *F01N 2610/105* (2013.01); *F01N 2900/1811* (2013.01); *F02D 41/1475* (2013.01); *F02D 2200/0806* (2013.01); *Y02T 10/22* (2013.01); *Y02T 10/47* (2013.01)

(58) Field of Classification Search
   USPC ............... 60/273, 274, 285, 286, 299, 301
   See application file for complete search history.

(56) References Cited

FOREIGN PATENT DOCUMENTS

| | | | |
|---|---|---|---|
| JP | 2006-22754 | | 1/2006 |
| JP | 2007046494 A | * | 2/2007 |
| JP | 2008-38890 | | 2/2008 |
| JP | 2010-71141 | | 4/2010 |
| JP | 4893876 | | 3/2012 |
| JP | 2013047467 A | * | 3/2013 |
| JP | 2013217266 A | * | 10/2013 |

* cited by examiner

FIG. 1
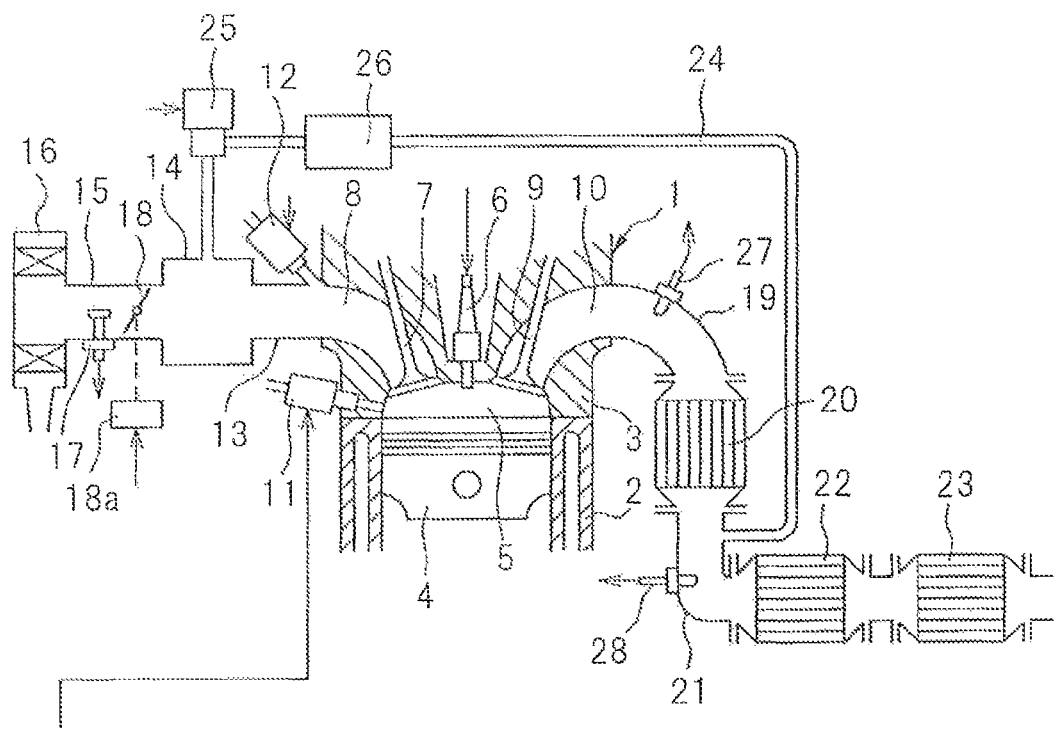
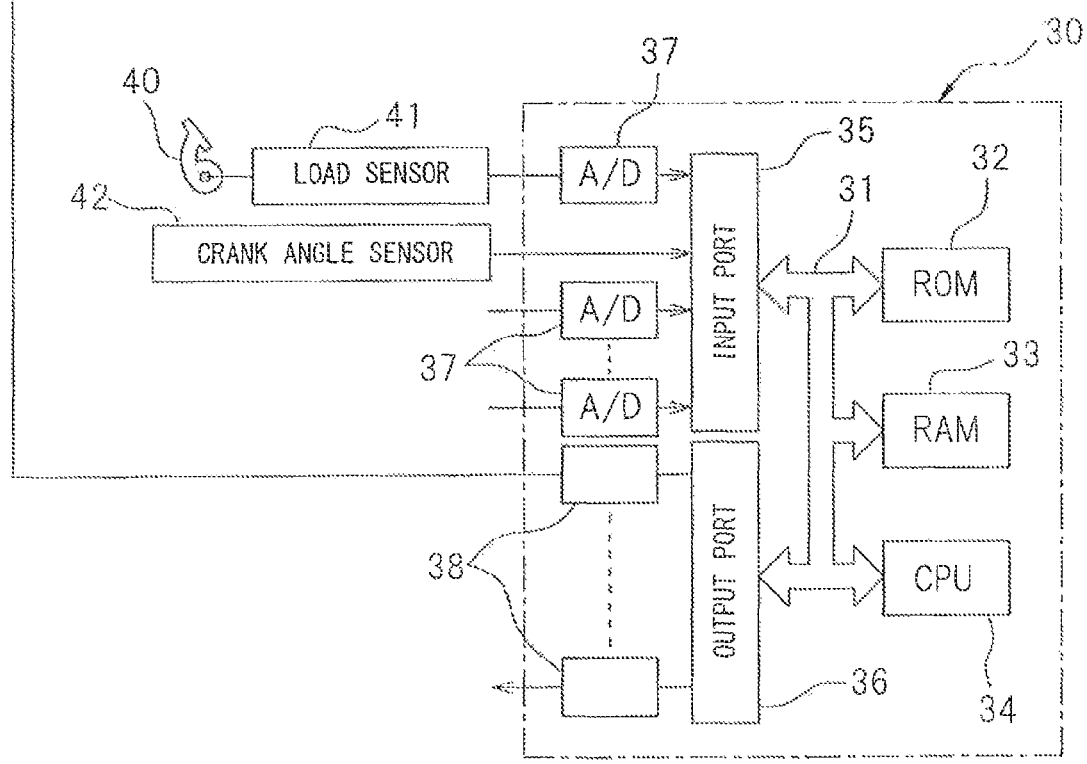

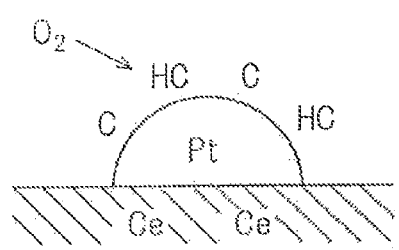
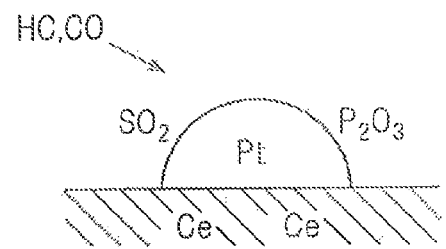
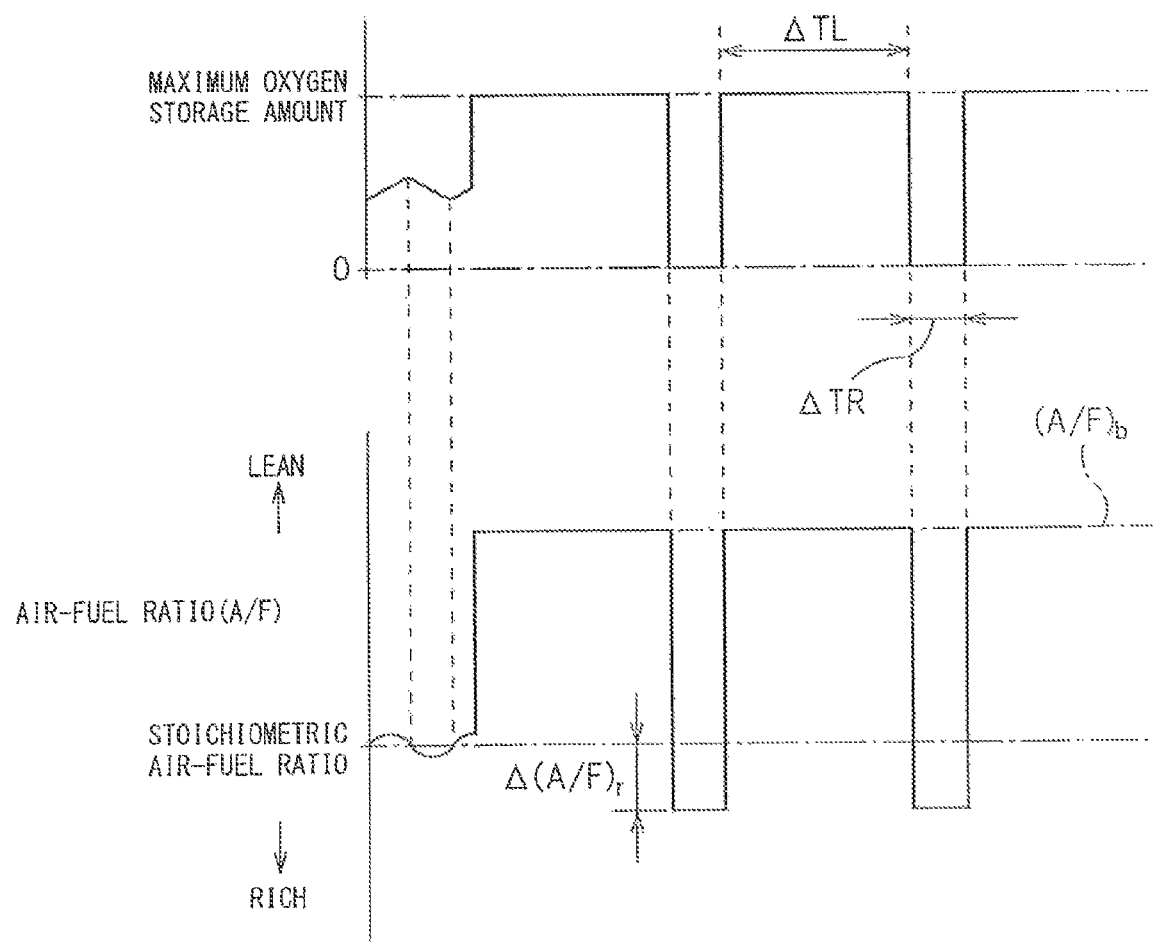

EXHAUST PURIFICATION SYSTEM OF SPARK IGNITION TYPE INTERNAL COMBUSTION ENGINE

CROSS-REFERENCE TO RELATED APPLICATIONS

This application is a national phase application of International Application No. PCT/JP2012/071693, filed Aug. 28, 2012, the content of which is incorporated herein by reference.

TECHNICAL FIELD

The present invention relates to an exhaust purification system of a spark ignition type internal combustion engine.

BACKGROUND ART

Known in the art is an internal combustion engine which arranges, in an engine exhaust passage, a three-way catalyst, arranges, downstream or the three-way catalyst in the engine exhaust passage, an $NO_x$ storage catalyst which stores $NO_x$ in exhaust gas when the air-fuel ratio of the inflowing exhaust gas is lean and releases the stored $NO_x$ when the air-fuel ratio of the inflowing exhaust gas is made rich, and which switches an engine operating mode in accordance with an engine operating state to either of a lean air-fuel ratio operating mode where the fuel is burned under a lean air-fuel ratio and a stoichiometric air-fuel ratio operating mode where the fuel is burned under a stoichiometric air-fuel ratio (for example, see PTL 1).

In such an internal combustion engine, burning fuel under a lean air-fuel ratio enables a smaller fuel consumption compared with the case of burning fuel under the stoichiometric air-fuel ratio. Therefore, in such an internal combustion engine, usually the fuel is burned under a lean air-fuel ratio in as broad an operating region as possible. However, if burning fuel under a lean air-fuel ratio when the engine load becomes high, the temperature of the $NO_x$ storage catalyst rises and as a result the $NO_x$ storage ability of the $NO_x$ storage catalyst falls, so the $NO_x$ purification rate falls. Therefore, in such an internal combustion engine, to prevent the $NO_x$ purification rate from falling, when the engine load becomes higher, the operating mode is shifted from the lean air-fuel ratio operating mode to the stoichiometric air-fuel ratio operating mode.

CITATION LIST

Patent Literature

PTL 1: Japanese Patent Publication No. 2008-38890A.

SUMMARY OF INVENTION

Technical Problem

However, in this way, if fuel is burned under the stoichiometric air-fuel ratio when the engine load becomes higher, there is the problem, that a precious metal catalyst carried, on the three-way catalyst is poisoned, and as result, an $NO_x$ purification rate drops.

Solution to Problem

According to the present invention, there is provided an exhaust purification system of a spark ignition type infernal combust ion engine in which a three-way catalyst having an oxygen storage function is arranged in an engine exhaust passage and am air-fuel ratio in a combustion chamber is feedback controlled to a stoichiometric air-fuel ratio so that an oxygen storage amount of the three-way catalyst becomes a value between zero and a maximum oxygen storage amount to simultaneously remove HC, CO, and $NO_x$ which are contained in an exhaust gas at the three-way catalyst, wherein when an engine operating state is one where if the air-fuel ratio in the combustion chamber were feedback controlled to the stoichiometric air-fuel ratio, an amount of poisoning of a precious metal catalyst carried on the three-way catalyst would gradually increase, or when an amount of poisoning of a precious metal catalyst increases and exceeds a predetermined allowable amount, a degree of leanness of the air-fuel ratio in the combustion chamber is increased compared with when the air-fuel ratio is feedback controlled to the stoichiometric air-fuel ratio so that an oxygen storage amount of the three-way catalyst increases to a maximum oxygen storage amount and, even after the oxygen storage amount of the three-way catalyst reaches the maximum, oxygen storage amount, the air-fuel ratio in the combustion chamber is maintained lean and then returned to rich, the time during which the air-fuel ratio in the combustion chamber is maintained lean is made longer the greater the amount of poisoning of the precious metal catalyst which occurs when the air-fuel ratio in the combustion chamber is rich.

Advantageous Effects of Invention

In a spark ignition type internal combustion engine, it is possible to obtain a high $NO_x$ purification rate even when the engine load becomes higher.

BRIEF DESCRIPTION OF DRAWINGS

FIG. 1 is an overall view of an internal combustion engine.

FIGS. 5A, 5B and 5C are views for explaining a poisoning action in a three-way catalyst.

DESCRIPTION OF EMBODIMENTS

Figure 2:
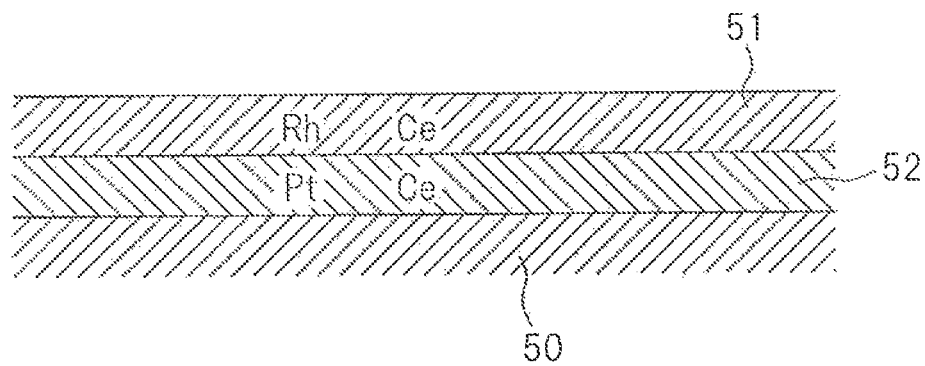
FIG. 2 is a view which schematically shows a surface part of a substrate of a three-way catalyst.

FIG. 1 is an overall view or a spark ignition type internal combustion engine in which a gasoline is used as a fuel. Referring to FIG. 1, 1 indicates an engine body, 2 a cylinder block, 3 a cylinder head, 4 a piston, 5 a combustion chamber, 6 a spark plug, 7 an intake valve, 8 an intake port, 9 an exhaust valve, and 10 an exhaust port. As shown in FIG. 1, each cylinder is provided with a pair of fuel injectors which are comprised of an electronic control type fuel injector 11 for injecting fuel, i.e. gasoline toward the inside of the combustion chamber 2 and an electronic control type fuel injector 12 for injecting fuel, i.e, gasoline toward the inside of the intake port 8. The intake port 8 of each cylinder is connected through an intake branch pipe 13 to a surge tank 14. The surge tank 14 is connected through an intake duct 15 to an air cleaner 16. Inside of the intake duct 15, an intake air amount detector 17 and a throttle valve 18 which is driven by an actuator 18a are arranged.

On the other hand, the exhaust port 10 of each cylinder is connected through an exhaust manifold 19 to the inlet of a three-way catalyst 20 having an oxygen storage function while the outlet of the three-way catalyst 20 is connected through an exhaust pipe 21 to the inlet of an exhaust purification catalyst 22. The outlet of the exhaust purification catalyst 22 is connected to an $NO_x$ selective reduction catalyst 23. On the other hand, the exhaust pipe 21 and the surge tank 14 are connected through an exhaust gas recirculation (below, called "EGR") passage 24 to each other. Inside of the EGR passage 24, an electronic control type EGR control valve 25 is arranged. Furthermore, a cooling device 26 is arranged around the EGR passage 24 for cooling the exhaust gas which flows through the inside of the EGR passage 24. In the embodiment which is shown in FIG. 1, she engine cooling water is introduced into the cooling device 26 and the engine cooling water is used to cool the exhaust gas.

An electronic control unit 30 is comprised of a digital computer provided with a ROM (read only memory) 32, a RAM (random access memory) 33, a CPU (microprocessor) 34, an input port 35, and an output port 36, which are connected with each other by a bidirectional bus 31. Upstream of the three-way catalyst 20, an air-fuel ratio sensor 27 is attached for detecting the air-fuel ratio of the exhaust gas which is exhausted from the engine. Downstream, of the three-way catalyst 20, an oxygen concentration sensor 28 is attached for detecting the oxygen concentration of the exhaust gas. The output signals of these air-fuel ratio sensor 27, oxygen concentration sensor 28, and intake air amount detector 17 are input through the corresponding AD converters 37 to the input port 35. Further, a load sensor 41 generating an output voltage which is proportional to the amount of depression of an accelerator pedal 40 is connected to the accelerator pedal 40. The output voltage of the load sensor 41 is input through the corresponding AD converter 37 to the input port 35. Furthermore, a crank angle sensor 42 generating an output pulse each time the crank shaft rotates by for example 30° is connected to the input port 35. On the other hand, the output port 36 is connected through the corresponding derive circuits 38 to the spark plugs 6, fuel injectors 11, 12, throttle valve drive actuator 18a, and EGR control valve 25.

FIG. 2 schematically shows the surface part of a substrate of the three-way catalyst 20. As shown in FIG. 2, on the catalyst carrier 50, a top coat layer 51 and a bottom coat layer 52 are formed in a laminated state. The top coat layer 51 is comprised of rhodium Rh and cerium Ce, while the bottom coat layer 52 is comprised of platinum Pt and cerium Ce. Note that, in this case, the amount of cerium Ce which is contained in the top coat layer 51 is smaller than the amount of cerium Ce which is contained in the bottom coat layer 52. Further, the top coat layer 51 can be made to include zirconium Zr in it, while the bottom coat layer 52 can be made to include palladium Pd in it.

Figure 3A:
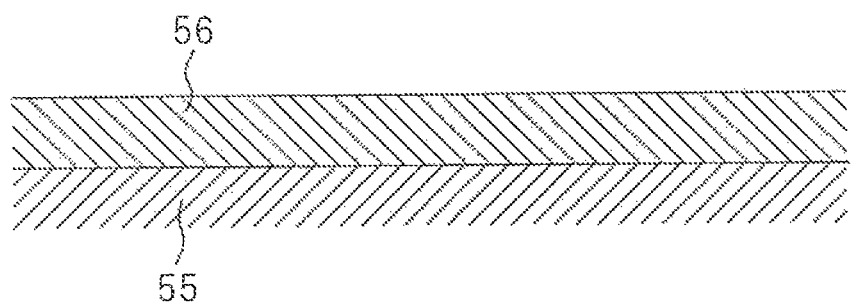
FIGS. 3A and 3B are views schematically showing a surface part, etc, of a catalyst carrier of an exhaust purification catalyst.
Figure 3B:
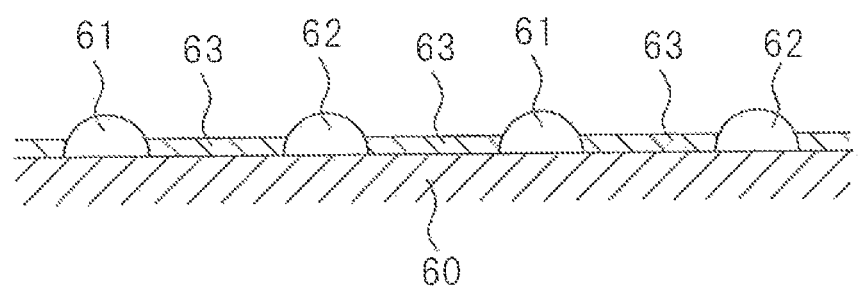

FIG. 3A schematically shows the surface part of the substrate 55 of the exhaust purification catalyst 22. As shown in FIG. 3A, in the exhaust purification catalyst 22 as well, a coat layer 56 is formed on the substrate 55. This coat layer 56 is comprised of for example an aggregate of powder. FIG. 3B shows an enlarged view of this powder. If referring to FIG. 3B, a catalyst carrier 60 which is comprised of this powder, for example, alumina, carries precious metal catalysts 61 and 62. Furthermore, this catalyst carrier 60 is formed with a basicity layer 63 which includes at least one element selected from potassium K, sodium Na, cesium Cs, and other such alkali metals, barium Ba, calcium Ca, and other such alkali earth metals, lanthanoids and other such rare earths and silver Ag, copper Cu, iron Fe, iridium Ir, and other such metals which donate electrons to $NO_x$. The exhaust gas flows along the top of the catalyst carrier 60, so the precious metal catalysts 61, 62 can be said to be carried on the exhaust gas flow surface of the exhaust purification catalyst 22. Further, the surface of the basic layer 63 exhibits basicity, so the surface of the basic layer 63 is called the "basic exhaust gas flow surface parts".

On the other hand, in FIG. 3B, the precious metal catalyst 61 is comprised of platinum Pt, while the precious metal catalyst 62 is comprised of rhodium Rh. Note that in this case, either of the precious metal catalysts 61 and 62 may also be comprised from platinum Pt. Further, the catalyst carrier 60 can carry on it not only platinum Pt and rhodium Rh but also palladium Pd or can carry on it, instead of rhodium Rh, palladium Pd. That is, the precious metal catalysts 61 and 62 which are carried on the catalyst carrier 60 are comprised of at least one of platinum Pt, rhodium Rh, and palladium Pd.

Now, the three-way catalyst 20 has the function of simultaneously reducing the harmful ingredients HC, CO, and $NO_x$ which are contained in exhaust gas when fuel is burned in the combustion chamber 5 under the stoichiometric air-fuel ratio, that is, when the air-fuel ratio of the exhaust gas which is exhausted from the engine is the stoichiometric air-fuel ratio. Therefore, when fuel is burned in the combustion chamber 5 under the stoichiometric air-fuel ratio, the harmful ingredients HC, CO, and $NO_x$ which are contained in the exhaust gas are removed in the three-way catalyst 20.

Note that, it is impossible to continue to hold the air-fuel ratio in the combustion chamber 5 completely at the stoichiometric air-fuel ratio. Therefore, in practice, the amounts of injection from the fuel injectors 11 and 12 are feedback controlled based on the detection signal of the air-fuel ratio sensor 27 so that the air-fuel ratio of the exhaust gas exhausted from the combustion chamber 5 is made to become substantially the stoichiometric air-fuel ratio, that is, the air-fuel ratio of the exhaust gas exhausted from the combustion chamber 5 is made to vibrate about the stoichiometric air-fuel ratio. Further, in this case, when the center of fluctuation of the air-fuel ratio of the exhaust gas is off from the stoichiometric air-fuel ratio, the air-fuel ratio of the exhaust gas is adjusted based on the output signal of the oxygen concentration sensor 28 so that the center of fluctuation of the air-fuel ratio of the exhaust gas returns to the stoichiometric air-fuel ratio. In this way, even if the air-fuel ratio of the exhaust gas exhausted from the combustion chamber 5 vibrates about the stoichiometric air-fuel ratio, the oxygen storage ability of the three-way catalyst 20 due to cerium Ce enables the harmful ingredients HC, CO, and $NO_x$ which are contained in she exhaust gas to be removed well at the three-way catalyst 20.

Figure 4A:
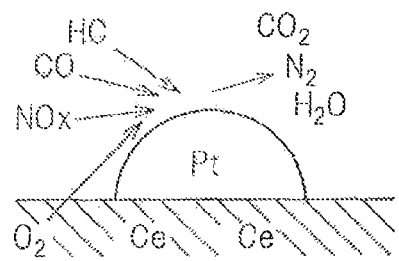
FIGS. 4A, 4B and 4C are views for explaining a purification action in an exhaust purification catalyst.
Figure 4B:
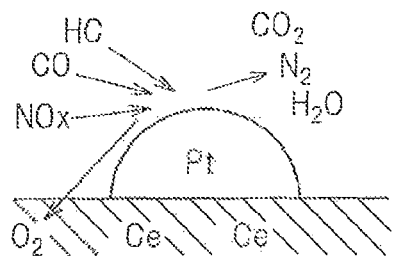
Figure 4C:
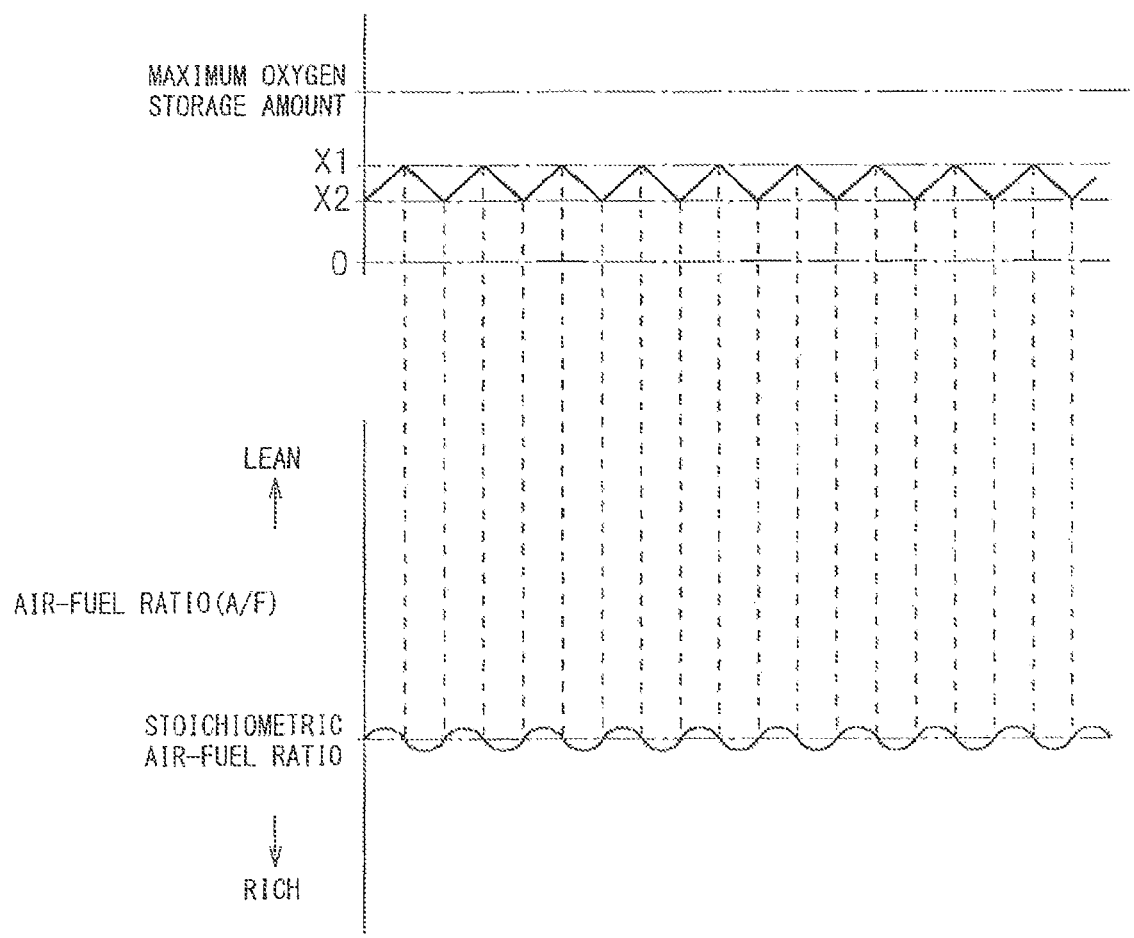

Next, this removal action in the three-way catalyst 20 will be explained in slightly more detail while referring to FIGS. 4A, 4B, and 4C. FIGS. 4A and 4B schematically show the oxidation reduction reaction in the three-way catalyst 20. FIG. 4A shows when the air-fuel ratio of the exhaust gas is just slightly richer than the stoichiometric air-fuel ratio. At this time, oxygen Co which is held by the cerium Ce in the form of ceria is released from the ceria. Due to this, on the surface of the platinum Pt, the air-fuel ratio of the exhaust gas becomes the stoichiometric air-fuel ratio. As a result, as shown in FIG. 4A, the harmful ingredients HC, CO, and $NO_x$ which are contained in the exhaust gas are simultaneously removed by the three-way catalyst 20. On the other hand, FIG. 4B shows when the air-fuel ratio of the exhaust gas is just slightly leaner than the stoichiometric air-fuel ratio. At this time, excess oxygen $O_2$ with respect to the stoichiometric air-fuel ratio is taken into the cerium Ce, whereby on the surface of the platinum Pt, the air-fuel ratio of the exhaust gas becomes the stoichiometric air-fuel ratio. As a result, as shown in FIG. 4B, the harmful ingredients HC, CO, and $NO_x$ which are contained in the exhaust gas are simultaneously removed by the three-way catalyst 20.

If making the air-fuel ratio of the exhaust gas fluctuate so that the action of release of oxygen $O_2$ from the ceria and the action of intake of excess oxygen $O_2$ by the cerium Ce can constantly occur, the harmful ingredients HC, CO, and $NO_x$ which are contained in the exhaust gas are removed well at the three-way catalyst 20. In this case, to enable the action of release of oxygen $O_2$ from the ceria and the action of intake of excess oxygen $O_2$ by the cerium Ce to constantly occur, as shown in FIG. 4C, it is sufficient to control the air-fuel ratio in the combustion chamber 5 so that the oxygen storage amount at the three-way catalyst 20 becomes a value between zero and the maximum oxygen storage amount, preferably the oxygen storage amount at the three-way catalyst 20 becomes about half of the maximum oxygen storage amount. In this case, the amount of release of oxygen $O_2$ from the ceria and the amount of intake of excess oxygen $O_2$ by the cerium Ce can be calculated from the difference between the actual air-fuel ratio and stoichiometric air-fuel ratio of the exhaust gas and the amount of intake air and therefore the oxygen storage amount of the three-way catalyst 20 can be calculated.

Therefore, in the embodiment according to the present invention, as will be understood from FIG. 4C, for example, when the calculated oxygen storage amount exceeds the predetermined upper limit value X1, the air-fuel ratio (A/F) in the combustion chamber 5 is made just slightly richer than the stoichiometric air-fuel ratio, while when the calculated oxygen storage amount falls below a predetermined lower limit value X2, the air-fuel ratio (A/F) in the combustion chamber 5 is made just slightly leaner than the stoichiometric air-fuel ratio. By doing this, the oxygen storage amount at the three-way catalyst 20 is maintained at about half of the maximum oxygen storage amount and therefore the harmful ingredients HC, CO, and $NO_x$ which are contained in the exhaust gas are removed well by the three-way catalyst 20. At this time, in actuality, the air-fuel ratio in the combustion chamber 5 fluctuates about the stoichiometric air-fuel ratio. That is, in the embodiment according to the present invention, the air-fuel ratio in the combustion chamber 5 is feedback controlled to the stoichiometric air-fuel ratio so that the oxygen storage amount in the three-way catalyst 20 becomes a value between zero and the maximum oxygen storage amount and thereby the HC, CO, and $NO_x$ which are contained in the exhaust gas are simultaneously removed by the three-way catalyst 20.

Next, the poisoning action of the precious metal catalyst which is carried on the three-way catalyst 20 will be explained with reference to FIGS. 5A and 5B. Note that these FIGS. 5A and 5B schematically show as an example the poisoning action of the precious metal catalyst Pt. If the air-fuel ratio of the exhaust gas becomes rich, as shown in FIG. 5A, hydrocarbons HC or carbon C deposits on the surface of the precious metal catalyst Pt and, as a result, the surface of the precious metal catalyst Pt is poisoned by the deposited hydrocarbons HC or carbon C. If the surface of the precious metal catalyst Pt is poisoned in this way, the $NO_x$ purification rate ends up falling.

In this regard, if the air-fuel ratio in the combustion chamber 5 is feedback controlled to the stoichiometric air-fuel ratio, when the engine load is low, that is, the fuel injection amount is small, the amount of hydrocarbons HC or carbon C which deposits on the surface of the precious metal catalyst PT during the time period when the air-fuel ratio of the exhaust gas is rich is small. In this case, when the air-fuel ratio of the exhaust gas becomes lean, these hydrocarbons HC and carbon C, as shown in FIG. 5A, are oxidized by the oxygen $O_2$ in the exhaust gas and therefore the precious metal catalyst Pt is not poisoned. However, when the air-fuel ratio in the combustion chamber 5 is feedback controlled to the stoichiometric air-fuel ratio, if the engine load becomes higher, that is, if the fuel injection amount becomes greater, while the air-fuel ratio of the exhaust gas is rich, the amount of the hydrocarbons HC or carbon C which deposits on the surface of the precious metal catalyst Pt becomes greater. In this case, when the air-fuel ratio of the exhaust gas becomes lean, the hydrocarbons HC or carbon C is not completely oxidized by the oxygen $O_2$ in the exhaust gas, therefore the amount of deposition of hydrocarbons HC or carbon C gradually increases, so the precious metal catalyst Pt is poisoned.

When the precious metal catalyst Pt is poisoned in this way, to recover the poisoning of the precious metal catalyst Pt, a large amount of oxygen $O_2$ becomes necessary. Therefore, in the present invention, when poisoning of the precious metal catalyst Pt should be recovered, as shown in FIG. 5C, the air-fuel ratio (A/F) in the combustion chamber 5, that is, the base air-fuel ratio (A/F)b, is made considerably leaner than the stoichiometric air-fuel ratio. That is, the degree of leanness of the air-fuel ratio in the combustion chamber 5 is made larger compared with when the air-fuel ratio is feedback controlled to the stoichiometric air-fuel ratio. At this time, as will be understood from FIG. 5C, the oxygen storage amount at the three-way catalyst 20 reaches the maximum oxygen storage amount and even after the oxygen storage amount reaches the maximum oxygen storage amount, the air-fuel ratio in the combustion chamber 5 is maintained lean. Next, the air-fuel ratio (A/F) in the combustion chamber 5 is made rich. If the air-fuel ratio in the combustion chamber 5 is maintained lean even after the oxygen storage amount in the three-way catalyst 20 reaches the maximum oxygen storage amount, the poisoning of the precious metal catalyst Pt is recovered.

On the other hand, to recover the poisoning of the precious metal catalyst Pt, it is necessary that the larger the amount of hydrocarbons HC or carbon C which deposits on the surface of the precious metal catalyst Pt during the time when the air-fuel ratio (A/F) in the combustion chamber 5 is rich, the longer the time ΔTL during which the air-fuel ratio (A/F) in the combustion chamber 5 is maintained lean. Therefore, in the present invention, when recovering poisoning of the precious metal catalyst Pt, the degree of leanness of the air-fuel ratio (A/F) in the combustion chamber 5 is made larger compared with when the air-fuel ratio is feedback controlled to the stoichiometric air-fuel ratio and, even after the oxygen storage amount of the three-way catalyst 20 reaches the maximum oxygen storage amount, the air-fuel ratio (A/F) in the combustion chamber 5 is maintained lean, then is returned to rich. At this time, the time ΔTL during which the air-fuel ratio (A/F) in the combustion chamber 5 is maintained lean is made longer the larger the amount of poisoning of the precious metal catalyst which occurs when the air-fuel ratio (A/F) in the combustion chamber 5 is rich.

Figure 6A:
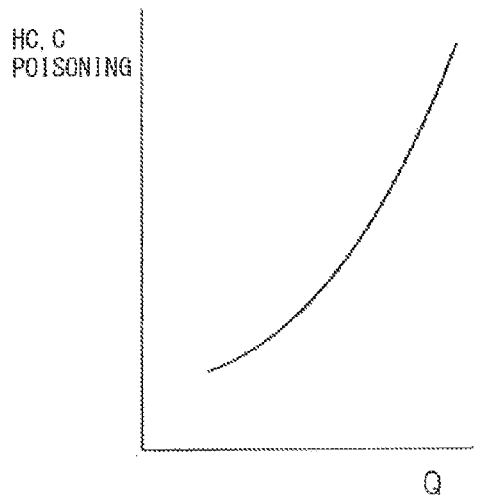
FIGS. 6A, 6B, 6C and 6d are views which show a poisoning amount in a three-way catalyst and a length of time during which an air-fuel ratio in a combustion chamber is maintained lean.
Figure 6B:
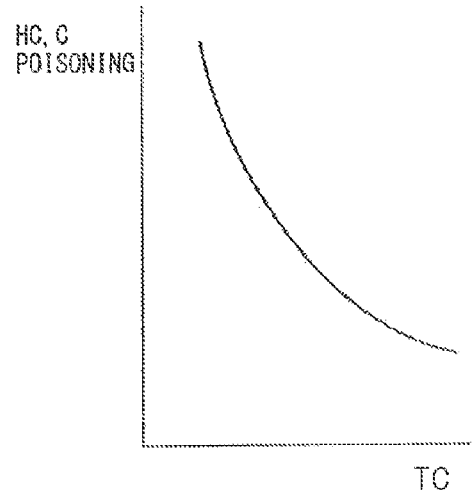
Figure 6C:
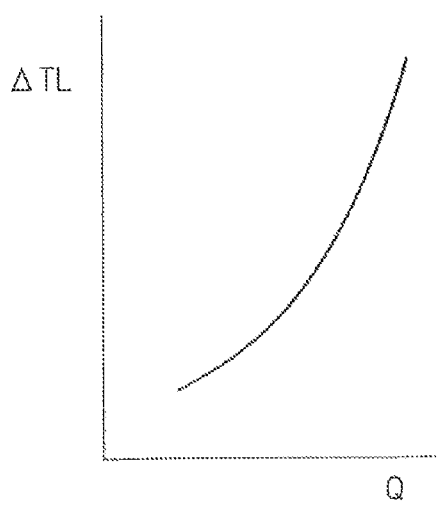
Figure 6D:
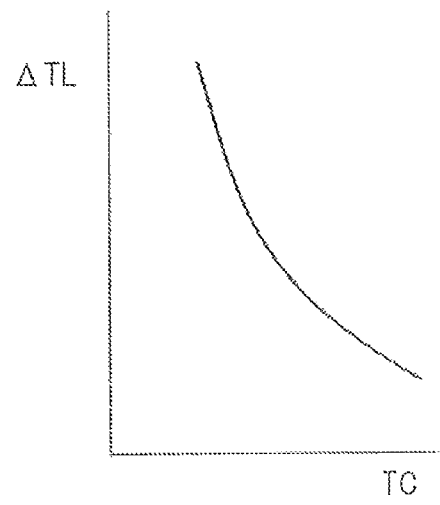

FIG. 6A shows the relationship between the amount of poisoning of the precious metal catalyst by the hydrocarbons HC or carbon C when the air-fuel ratio (A/F) in the combustion chamber 5 is made a certain rich air-fuel ratio for a certain time period and the fuel injection amount Q, while FIG. 6B shows the relationship between the amount of poisoning of the precious metal catalyst by the hydrocarbons HC or carbon C when the air-fuel ratio (A/F) in the combustion chamber 5 is made a certain rich air-fuel ratio for a certain time period and the temperature TC of the three-way catalyst 20. Further, FIG. 6C shows the relationship between the lean time ΔTL of the air-fuel ratio which is required for recovery of poisoning of the precious metal catalyst and the fuel injection amount Q, while FIG. 6D shows the relationship between the lean time ΔTL of the air-fuel ratio which is required for recovery of poisoning of the precious metal catalyst and the temperature TC of the three-way catalyst 20.

As shown in FIG. 6A, the amount of the hydrocarbons HC in the exhaust gas when the air-fuel ratio (A/F) in the combustion chamber 5 is made a certain rich, air-fuel ratio for a certain time period increases the more the fuel injection amount Q increases, that is, the higher the engine load becomes, therefore the amount of hydrocarbons HC or carbon C which deposits on the surface of the precious metal catalyst Pt during the rich period increases the more the fuel injection amount Q increases, that is, the higher the engine load becomes. Therefore, as explained above, as shown in FIG. 6C, when recovering poisoning of the precious metal catalyst, the greater the fuel injection amount Q that is, the higher the engine load, the longer the lean time ΔTL of the air-fuel ratio is made.

On the other hand, as shown in FIG. 6B, the amount of hydrocarbons HC in the exhaust gas when the air-fuel ratio (A/F) in the combustion chamber 5 is made a certain rich air-fuel ratio for a certain time falls the higher the temperature TC of the three-way catalyst 20. Therefore, the amount of hydrocarbons HC or carbon C which deposits on the surface of the precious metal catalyst Pt during the rich period falls the higher the temperature TC of the three-way catalyst 20. Therefore, as shown in FIG. 6D, at the time of recovering poisoning of precious metal catalyst, the lean time ΔTL of the air-fuel ratio is made shorter the higher the temperature TC of the three-way catalyst 20.

Note that, the surface of the precious metal catalyst Pt. is not only poisoned by the hydrocarbons HC or carbon C, but is also poisoned by sulfur S or phosphorus P as shown in FIG. 5B. In this case as well, the $NO_x$ purification rare falls. On the other hand, the sulfur S or phosphorus P is reduced by the HC or CO which is contained in the exhaust gas and released as shown in FIG. 5B when the air-fuel ratio of the exhaust gas is made rich, Due to this, the poisoning by the sulfur S or phosphorus P is recovered. In this regard, when the air-fuel ratio in the combustion chamber 5 is feedback controlled to the stoichiometric air-fuel ratio, the air-fuel ratio of the exhaust gas is made rich by a short period. Therefore, at this time, the poisoning by the sulfur S or phosphorus P is immediately recovered even as the poisoning by the sulfur S or phosphorus P occurs. As opposed to this, if the time during which the air-fuel ratio in the combustion chamber 5 is maintained lean becomes longer, the amount of deposition of sulfur S or phosphorus P increases, therefore the amount of poisoning by sulfur S or phosphorus P increases.

In this case, to recover the poisoning by sulfur S or phosphorus P, a large amount of HC or CO becomes necessary. Therefore, in the present invention, when the poisoning by sulfur S or phosphorus P should be recovered, as shown in FIG. 5C, the air-fuel ratio (A/F) in the combustion chamber 5 is made richer than the stoichiometric air-fuel ratio. The rich degree Δ(A/F)r of the air-fuel ratio in the combustion chamber 5 at this time is made larger compared with when the air-fuel ratio is feedback controlled to the stoichiometric air-fuel ratio. At this time, as will be understood from FIG. 5C, the oxygen storage amount in the three-way catalyst 20 falls to zero and even after the oxygen storage amount becomes zero, the air-fuel ratio in the combustion chamber 5 is maintained rich. Next, the air-fuel ratio (A/F) in the combustion chamber 5 is made lean. In this way, if, even after the oxygen storage amount in the three-way catalyst 20 becomes zero, the air-fuel ratio in the combustion chamber 5 is maintained rich, the poisoning by sulfur S or phosphorus P is recovered.

That is, in the present invention, the rich degree Δ(A/F)r when the air-fuel ratio in the combustion chamber 5 is returned to rich after being maintained lean to recover the poisoning by sulfur S or phosphorus P is made larger compared with when the air-fuel ratio is feedback controlled to the stoichiometric air-fuel ratio so that the oxygen storage amount of the three-way catalyst 20 decreases to zero and, even after the oxygen storage amount of the three-way catalyst 20 reaches the maximum oxygen storage amount, the air-fuel ratio in the combustion chamber 5 is maintained rich and then returned to lean. Note that, the longer the time ΔTL during which the air-fuel ratio (A/F) in the combustion chamber 5 is maintained lean, the more the amount of poisoning by sulfur S or phosphorus P increases. Therefore, in the present invention, when recovering poisoning by sulfur S or phosphorus P, the longer the time $\Delta TL$ during which the air-fuel ratio (A/F) in the combustion chamber 5 is maintained lean, the longer the time $\Delta TR$ during which the air-fuel ratio (A/F) in the combustion chamber 5 is made rich.

Figure 7A:
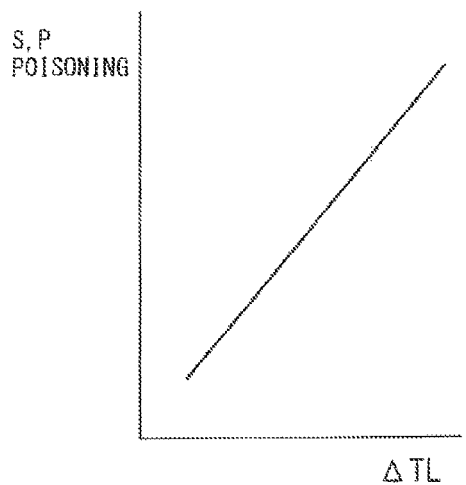
FIGS. 7A, 7B, 7C and 7d are views which show a poisoning amount in a three-way catalyst and a length of time during which an air-fuel ratio in a combustion chamber is made rich.
Figure 7B:
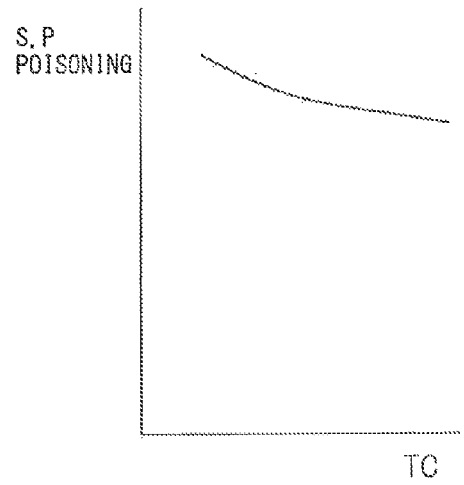
Figure 7C:
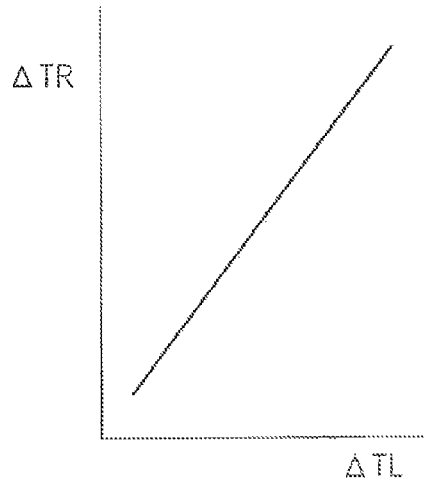
Figure 7D:
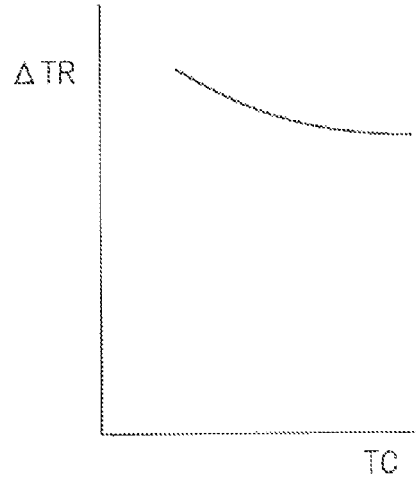

FIG. 7A shows the relationship between the amount of poisoning by sulfur S or phosphorus P and the time $\Delta TL$ during which the air-fuel ratio in the combustion chamber 5 is maintained lean, while FIG. 7B shows the relationship between the amount of poisoning by sulfur S or phosphorus P and the temperature TC of the three-way catalyst 20. Further, FIG. 7C shows the relationship between the rich time $\Delta TR$ of the air-fuel ratio which is required for recovery of poisoning by sulfur S or phosphorus P and the time $\Delta TL$ during which the air-fuel ratio in the combustion chamber 5 is maintained lean, while FIG. 7D shows the relationship between the rich time $\Delta TR$ of the air-fuel ratio which is required for recovery of poisoning by sulfur S or phosphorus P and the temperature TC of the three-way catalyst 20.

As shown in FIG. 7A, the amount of poisoning by sulfur S or phosphorus P increases the longer the time $\Delta TL$ during which the air-fuel ratio in the combustion chamber 5 is maintained lean. Therefore, as explained above, as shown in FIG. 7C, when recovering poisoning by sulfur S or phosphorus P, the longer the lean time $\Delta TL$ of the air-fuel ratio in the combustion chamber 5, the longer the rich time $\Delta TR$ of the air-fuel ratio is made. On the other hand, as shown in FIG. 7B, the amount of poisoning by sulfur S or phosphorus P falls slightly the higher the temperature TC of the three-way catalyst 20 becomes. Therefore, as shown in FIG. 7D, when recovering poisoning by sulfur S or phosphorus P, the higher the temperature TC of the three-way catalyst 20, the slightly shorter the rich time $\Delta TR$ of the air-fuel ratio is made.

Figure 8A:
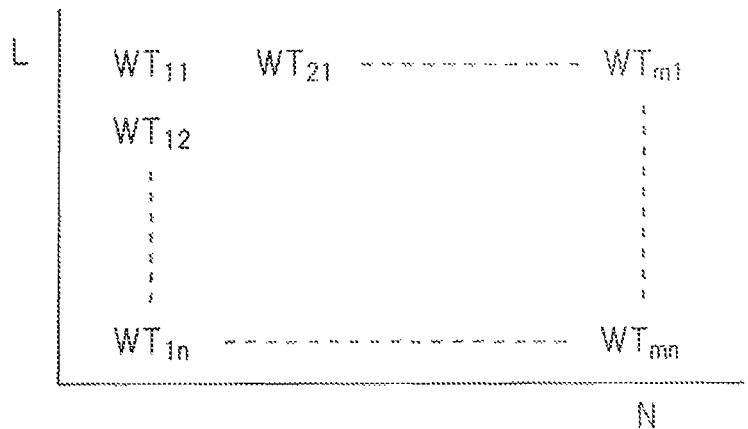
FIGS. 8A, 8B and 8C are views which show a fuel injection time, etc.
Figure 8B:
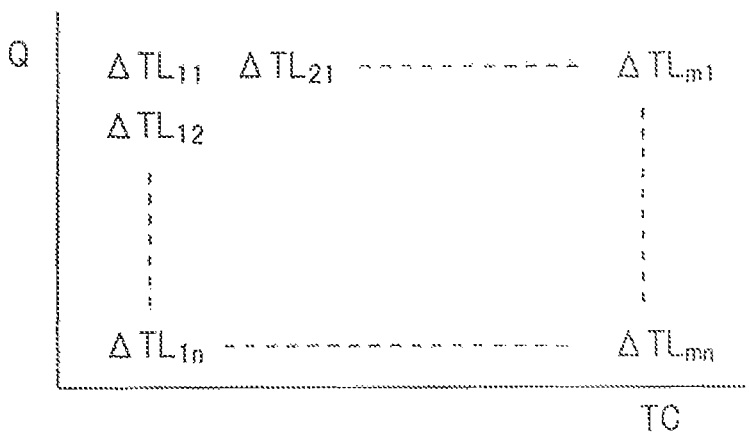
Figure 8C:
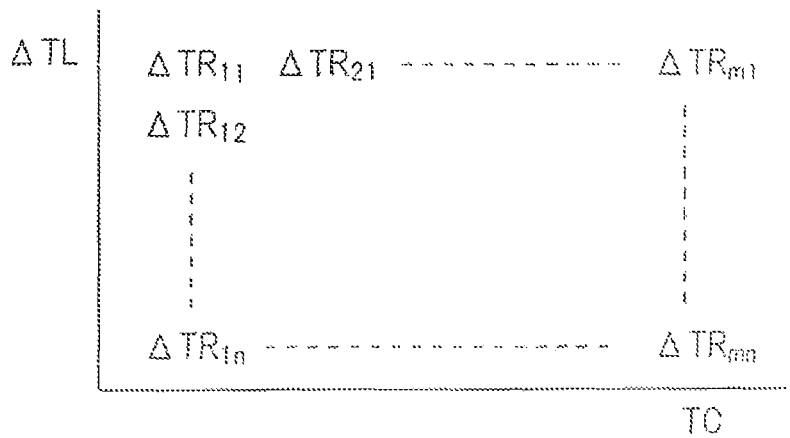

In the embodiment according to the present invention, the fuel injection amount WT from the fuel injectors 11 and 12 for obtaining the rich degree $\Delta(A/F)r$ which is required at the time of recovery of poisoning is stored as a function of the required load L and the engine speed N in the form of the map such as shown in FIG. 8A in advance in the ROM 32. Further, the optimum lean time $\Delta TL$ at the time of recovery of poisoning is stored as a function of the fuel injection amount Q and the temperature TC of the three-way catalyst 20 in the form of the map such as shown in FIG. 8B in advance in the ROM 32. Further, the optimal rich time $\Delta TR$ at the time of recovery of poisoning is stored as a function of the lean time $\Delta TL$ and the temperature TC of the three-way catalyst 20 in the form of the map such as shown in FIG. 8C in advance in the ROM 32.

Now then, as shown in FIG. 6A, the amount of poisoning of the precious metal catalyst by the hydrocarbons HC or carbon C increases the more the fuel injection amount Q increases, that is, the higher the engine load becomes. On the other hand, as shown in FIG. 6B, the amount of poisoning of the precious metal catalyst by the hydrocarbons HC or carbon C decreases the higher the temperature TC of the three-way catalyst 20 becomes, that is, the higher the engine load becomes. That is, at the time of engine high load operation, the operating state becomes one where the fuel injection amount Q becomes greater and the amount of poisoning increases, but the three-way catalyst 20 becomes higher in temperature TC and decreased in amount of poisoning, so at this time, the amount of poisoning does not increase that much. On the other hand, at the time of engine low load operation, the operating state becomes one where the three-way catalyst 20 becomes higher in temperature TC and increased in the amount or poisoning, but the fuel injection amount Q is small and the amount of poisoning is decreased, so at this time as well, the amount of poisoning does not increase that much. In the final analysis, the amount of poisoning of the precious metal catalyst by the hydrocarbons HC or carbon C becomes highest at the time of engine medium load operation when the fuel injection amount Q is relatively large and the temperature TC of the three-way catalyst 20 does not easily become relatively high. Therefore, in the embodiment which is shown in FIG. 9A, when in an engine operating state where if the air-fuel ratio in the combustion chamber were feedback controlled to the stoichiometric air-fuel ratio, the amount of poisoning of the precious metal catalyst which is carried at the three-way catalyst would gradually increase, that is, at the time of engine medium load operation, the engine is operated to enable recovery of poisoning of the three-way catalyst 20.

Figure 9A:
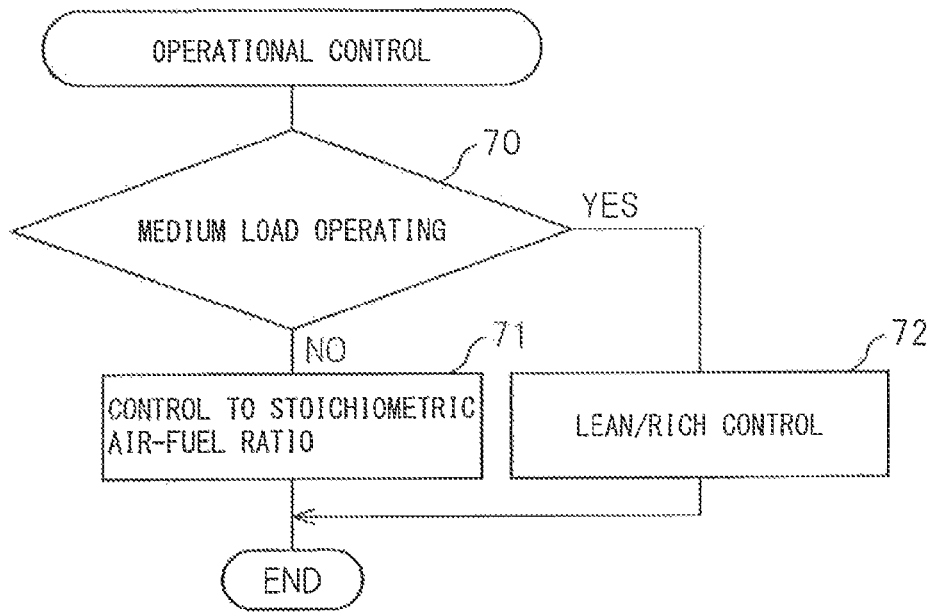
FIGS. 9A and 9B are flow charts for perform frig an engine operation control.

That is, referring to FIG. 9A, first, at step 70, it is judged if it is the time of an engine medium load operation. When not the time of an engine medium load operation, the routine proceeds to step 71 where the air-fuel ratio in the combustion chamber 5 is feedback controlled to the stoichiometric air-fuel ratio so that the oxygen storage amount of the three-way catalyst 20 becomes a value between zero and the maximum oxygen storage amount. As opposed to this, when it is judged at step 70 that it is the time of an engine medium load operation, the routine proceeds to step 72 where the fuel injection amount WT, lean time $\Delta TL$, and rich, time $\Delta TR$ are respectively calculated from FIGS. 8A, 8B, and 8C, and lean/rich control enabling recovery of poisoning which is shown in FIG. 5C is performed based on these fuel injection amount WT, lean time $\Delta TL$, and rich time $\Delta TR$.

Figure 9B:
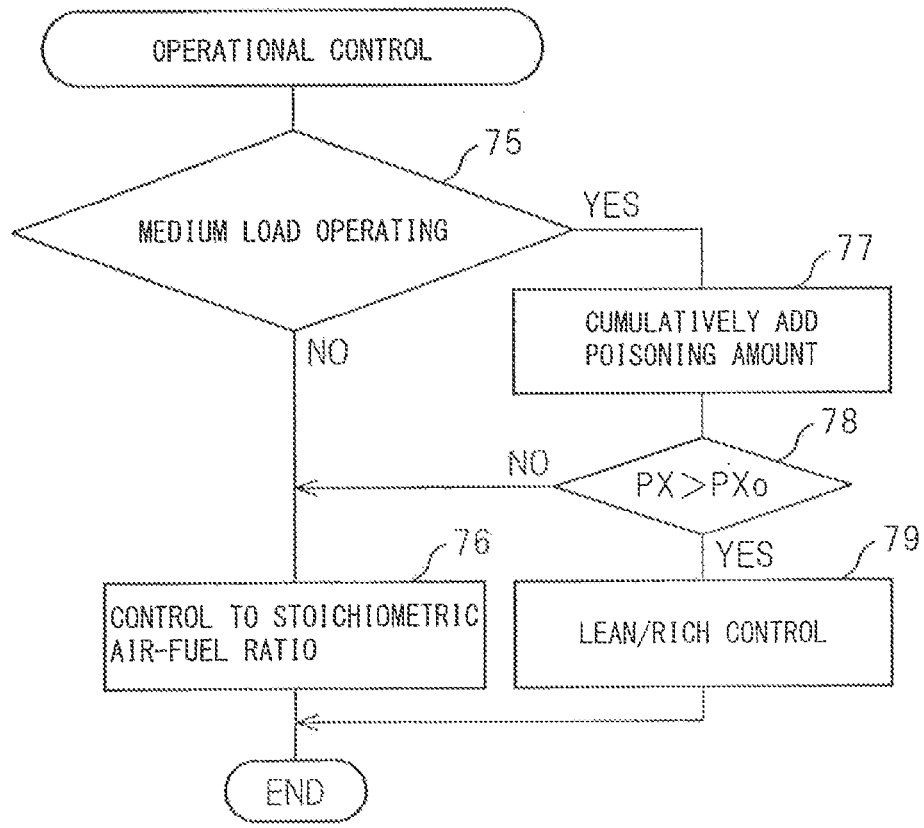

FIG. 9B shows an embodiment of performing engine operation enabling recovery of poisoning of the three-way catalyst 20 when the amount of poisoning of the precious metal catalyst exceeds an allowable amount during engine medium load operation. That is, referring to FIG. 9B, first, at step 75, it is judged that it is the time of an engine medium load operation. When it is not the time of an engine medium load operation, the routine proceeds to step 76 where the air-fuel ratio in the combustion chamber 5 is feedback controlled to the stoichiometric air-fuel ratio so that the oxygen storage amount of the three-way catalyst 20 becomes a value between zero and the maximum oxygen storage amount. As opposed to this, when it is judged at step 75 that it is the time of engine medium load operation, the routine proceeds to step 77, where the amount of poisoning of the precious metal catalyst by the hydrocarbons HC or carbon C is cumulatively added.

Next, at step 78, it is judged if the cumulative value PX of the amount of poisoning of the precious metal catalyst by the hydrocarbons HC or carbon C exceeds the allowable amount $PX_o$. When the cumulative value PX of the amount of poisoning of the precious metal catalyst does not exceed the allowable amount $PX_o$, the routine proceeds to step 76 where the air-fuel ratio in the combustion chamber 5 is feedback controlled to the stoichiometric air-fuel ratio so that the oxygen storage amount of the three-way catalyst 20 becomes a value between zero and the maximum oxygen storage amount. As opposed to this, when it is judged at step 78 that the cumulative value PX of the amount of poisoning of the precious metal catalyst, exceeds the allowable amount $PX_o$, the routine proceeds to step 79 where the fuel injection amount WT, lean time $\Delta TL$, and rich time $\Delta TR$ are respectively calculated from FIGS. 8A, 8B, and 8, and lean/rich control enabling recovery of poisoning which is shown in FIG. 5C is performed based on these fuel injection amount WT, lean time ΔTL, and rich time ΔTR.

In this way, in the present invention, in an exhaust purification system of a spark ignition type internal combustion engine in which a three-way catalyst 20 having an oxygen storage function is arranged in an engine exhaust passage and an air-fuel, ratio in a combustion chamber 5 is feedback controlled to a stoichiometric air-fuel ratio so that an oxygen storage amount of the three-way catalyst 20 becomes a value between zero and a maximum oxygen storage amount to simultaneously remove HC, CO, and $NO_x$ which are contained in an exhaust gas at the three-way catalyst 20, when the engine operating state is one where if the air-fuel ratio in the combustion chamber 5 were feedback controlled to the stoichiometric air-fuel ratio, the amount of poisoning of the precious metal catalyst which is carried on the three-way catalyst would gradually increase, or when the amount of poisoning of the precious metal catalyst increases and exceeds a predetermined allowable amount, the degree of leanness of the air-fuel ratio in the combustion chamber 5 is increased compared with when the air-fuel ratio is feedback controlled to the stoichiometric air-fuel ratio so that the oxygen storage amount of the three-way catalyst 20 increases to the maximum oxygen storage amount and, even after the oxygen storage amount of the three-way catalyst 20 reaches the maximum oxygen storage amount, the air-fuel ratio in the combustion chamber 5 is maintained lean and then returned to rich. At this time, the time during which the air-fuel ratio in the combustion chamber 5 is maintained lean is made longer the greater the amount of poisoning of the precious metal catalyst which occurs when the air-fuel ratio in the combustion chamber 5 is rich.

In this regard, in case where the lean/rich control enabling recovery of poisoning which is shown in FIG. 5C is being performed, when the air-fuel ratio in the combustion chamber 5 is lean, the $NO_x$ which is contained in the exhaust gas flows out from the three-way catalyst 20. However, in the embodiment according to the present invention, at this time, the $NO_x$ which flows out from the three-way catalyst 20 is removed at the exhaust purification catalyst 22. The fact that the action of adsorption of NO at the exhaust purification catalyst 13 has a great effect on the $NO_x$ removal action at the exhaust purification catalyst 22 at this time was discovered by the present inventors etc. Therefore, next, this $NO_x$ removal method discovered by the present inventors etc. will be explained.

That is, in the past, it has been known that the exhaust purification catalyst 22 adsorbs NO. However, the behavior of the adsorbed NO has not been pursued that much at all up to now. Therefore, the inventors pursued the behavior of the adsorbed NO and found out that if utilizing the adsorption characteristics of this adsorbed NO, it is possible to secure a high $NO_x$ purification rate when fuel is burned under a lean air-fuel ratio in a state that the temperature TC of the exhaust purification catalyst 22 is low and even when fuel is burned under a lean air-fuel ratio in a state that the temperature TC of the exhaust purification catalyst 22 is high. This new $NO_x$ removal method utilizes the HO adsorption action, so below this new $NO_x$ removal method will be referred to as an "$NO_x$ removal method utilizing adsorbed NO". Therefore, first, this $NO_x$ removal method utilizing adsorbed NO will be explained while referring to FIG. 10A to FIG. 10B.

Figure 10A:
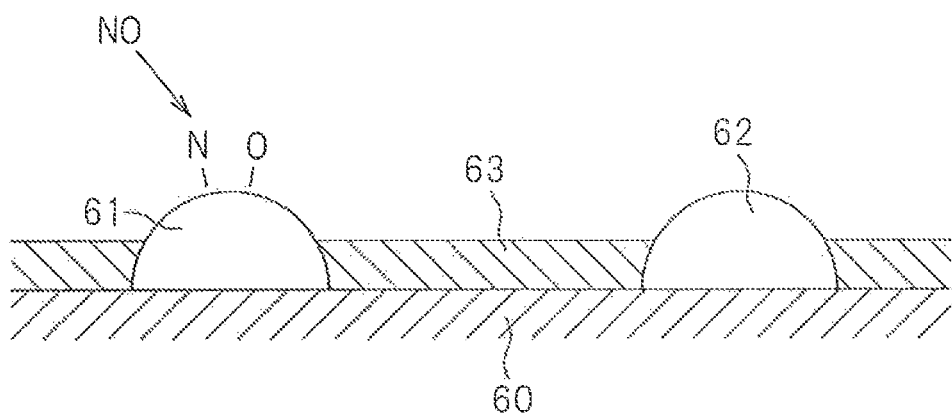
FIGS. 10A and 10B are views for explaining an adsorbing action, etc in an exhaust purification catalyst.
Figure 10B:
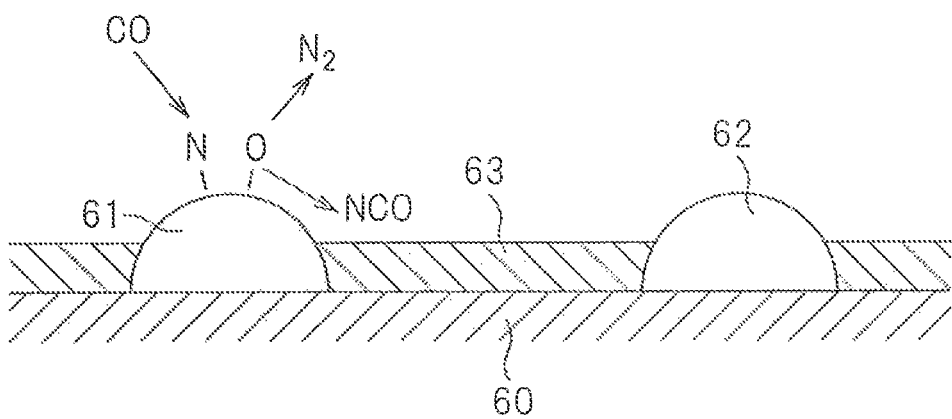

FIGS. 10A and 10B are enlarged views of FIG. 3B, that is, show surface parts of the catalyst carrier 60 of the exhaust purification catalyst 22. Further, FIG. 10A shows the time when fuel is burned under a lean air-fuel ratio, while FIG. 10B shows the time when the air-fuel ratio in the combustion chamber 5 is made rich. When the air-fuel ratio of the exhaust gas is lean, the NO which is contained in the exhaust gas, as shown in FIG. 10A, disassociates and is adsorbed at the surface of the platinum Pt 61. The amount of adsorption of NO on the surface of the platinum Pt 61 increases together with the elapse of time. Therefore, along with the elapse of time, the amount of adsorption of NO at the exhaust purification catalyst 22 increases.

On the other hand, if the air-fuel ratio of the exhaust gas is made rich, a large amount of carbon monoxide CO is contained in the exhaust gas which flows into the exhaust purification catalyst 22. This carbon monoxide CO, as shown in FIG. 10B, reacts with the NO which disassociates and is adsorbed at the surface of the platinum Pt 61. This NO on the one hand becomes $N_2$ and on the other hand becomes the reducing intermediate NCO. This reducing intermediate NCO continues to be held or adsorbed on the surface of the basic layer 63 for a while after being produced. Therefore, the amount of the reducing intermediate NCO on the basic layer 63 gradually increases along with the elapse of time. This reducing intermediate NCO reacts with the $NO_x$ which is contained in the exhaust gas whereby the $NO_x$ which is contained in the exhaust gas is removed.

In this way, when the air-fuel ratio of the exhaust gas is lean, on the one hand, as shown in FIG. 10A, the NO contained in the exhaust gas is adsorbed at the exhaust purification catalyst 22, and on the other hand, the $NO_x$ contained in the exhaust gas reacts with the reducing intermediate NCO which is held or adsorbed on the surface of the basic layer 63 and is purified. As opposed to this, if the air-fuel ratio in the combustion chamber 5 is made rich, the $NO_x$ which had been adsorbed at the exhaust purification catalyst 22 is released from the exhaust purification catalyst 22 and reduced. Accordingly, if the air-fuel ratio of the exhaust gas is switched periodically from lean to rich as shown in FIG. 5A, the $NO_x$ contained in the exhaust gas is purified at the exhaust purification catalyst 22.

Now, when fuel is burned under a lean air-fuel ratio, that is, when the air-fuel ratio of the exhaust gas is lean, as mentioned above, the NO which is contained in the exhaust gas, as shown in FIG. 10A, disassociates and is adsorbed at the surface of the platinum Pt 61. However, the $NO_x$ which is contained in the exhaust gas is absorbed in the exhaust purification catalyst 22 when some time has elapsed after fuel starts to be burned under a lean air-fuel ratio. Here, to clarify the feature of $NO_x$ removal method utilizing adsorbed NO which was explained with reference to FIGS. 10A and 10B, next, the action of adsorption and release of $NO_x$ by the exhaust purification catalyst 22 will be explained with reference to FIGS. 11A and 11B which are enlarged views of FIG. 3B.

Figure 11A:
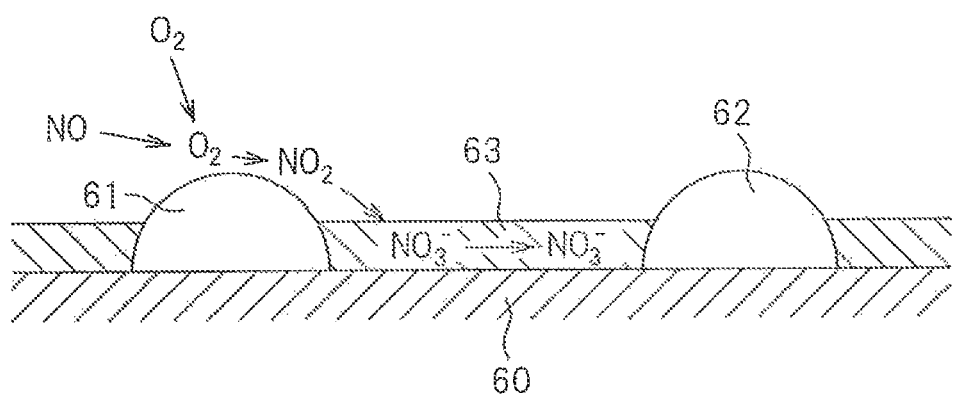
FIGS. 11A and 11B are views for explaining an oxidation reduction reaction in an exhaust purification catalyst.

Now, when fuel is burned under a lean air-fuel ratio, that is, when the air-fuel ratio of the exhaust gas is lean, the oxygen concentration of the exhaust gas is high. Therefore, at this time, the NO which is contained in the exhaust gas, as shown in FIG. 11A, is oxidized on the platinum Pt 61 to become $NO_2$. Next, if some time has elapsed after fuel starts to be burned under a lean air-fuel ratio, the $NO_2$ on the platinum Pt 61 is absorbed in the basic layer 63 to diffuse in the form of nitric acid ions $NO_3^-$ inside the basic layer 63 and become nitrates. In this way, the $NO_x$ in the exhaust gas is absorbed in the form of nitrates in the basic layer 63. After some time has elapsed from when, fuel starts to be burned under a lean air-fuel ratio, so long as the oxygen concentration of the exhaust gas is nigh, $NO_2$ is formed on the surface of the platinum Pt 61, and so long as the $NO_x$ absorption ability of the basic layer 63 is not saturated, the $NO_x$ is absorbed in the basic layer 63 and nitrates are formed.

Figure 11B:
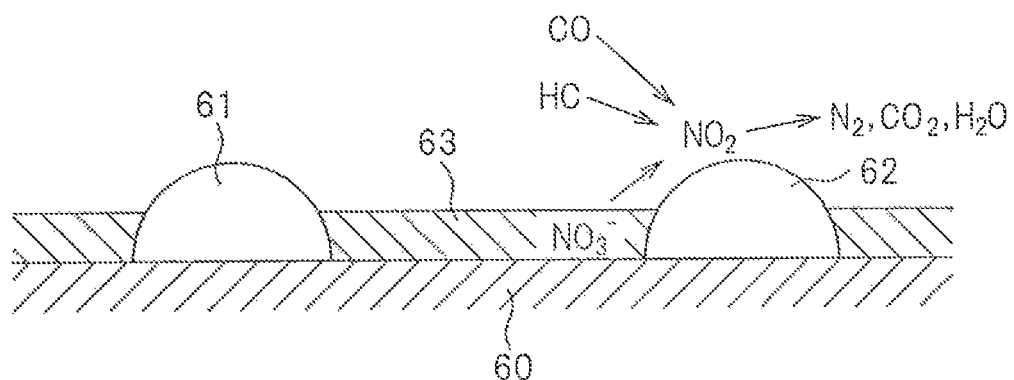

As opposed to this, if the air-fuel ratio in the combustion chamber 5 is made rich, that is, if the air-fuel ratio of the exhaust gas is made rich, the oxygen concentration of the exhaust gas which flows into the exhaust purification catalyst 22 falls, so the reaction proceeds in the opposite direction ($NO_3^- \rightarrow NO_2$) and therefore nitrates which are absorbed in the basic layer 63 successively become nitric acid ions $NO_3^-$ and, as shown in FIG. 11B, are released in the form of $NO_2$ from the basic layer 63. Next, the released $NO_2$ is reduced by the hydrocarbons HC and CO which are contained in the exhaust gas.

Note that, when fuel is burned in a lean air-fuel ratio, as mentioned above, NO is adsorbed at the surface of the platinum Pt 61. Therefore, the NO in the exhaust gas is held at the exhaust purification catalyst 22 by this adsorption action as well. The NO which is adsorbed at the surface of the platinum Pt 61 is desorbed from the surface of the platinum PT 61 if air-fuel ratio of the exhaust gas is made rich. Therefore, if using the term "storage" as the term including both absorption and adsorption, the basic layer 63 plays the role of an $NO_x$ storage agent for temporarily storing the $NO_x$. Therefore, if referring to the ratio of the air and fuel (hydrocarbons) which are fed into the engine intake passage, combustion chambers 5, and exhaust passage upstream of the exhaust purification catalyst 22 is referred to as the "air-fuel ratio of the exhaust gas", the exhaust purification catalyst 22 stores $NO_x$ when the air-fuel ratio of the exhaust gas which flows into the exhaust purification catalyst 22 is lean and releases the stored $NO_x$ when the air-fuel ratio of the exhaust gas which flows into the exhaust purification catalyst 22 becomes rich.

As mentioned above, when some time has elapsed after fuel starts to be burned under a lean air-fuel ratio, the $NO_x$ in the exhaust gas starts to be stored in the exhaust purification catalyst 22. However, if fuel continues to be burned under a lean air-fuel ratio, during that time, the $NO_x$ storage ability of the exhaust purification catalyst 22 will end up being saturated. As a result, the exhaust purification catalyst 22 will no longer be able to store $NO_x$. Therefore, before the exhaust purification catalyst 22 becomes saturated in $NO_x$ storage ability, the air-fuel ratio in the combustion chamber 5 is made temporarily rich and thereby the exhaust purification catalyst 22 is made to release $NO_x$.

Figure 12:
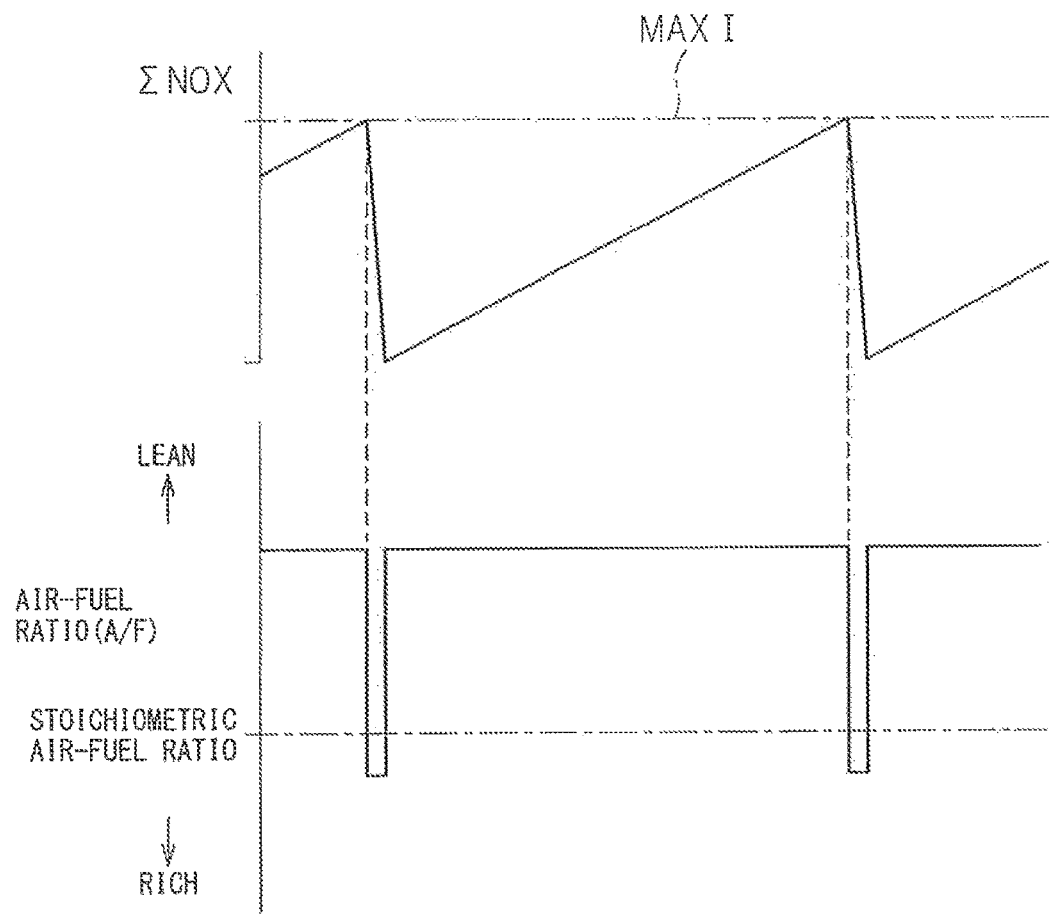
FIG. 12 is a view which shows $NO_x$ release control.

FIG. 12 shows the control for release of $NO_x$ in case where the $NO_x$ is absorbed in the exhaust purification catalyst 22. Referring to FIG. 12, the air-fuel ratio (A/F) in the combustion chamber 5 is temporarily made rich when the stored $NO_x$ amount $\Sigma NOX$ which is stored in the exhaust purification catalyst 22 exceeds the predetermined allowable $NO_x$ storage amount MAXI. If the air fuel ratio (A/F) in the combustion chamber 5 is made rich, that is, if the air-fuel ratio of the exhaust gas which flows into the $NO_x$ storage catalyst 22 is made rich, the $NO_x$ which was stored in the exhaust purification catalyst 22 when the fuel was burned under a lean air-fuel ratio, is released all at once from the exhaust purification catalyst 22 and reduced. Due to this, the $NO_x$ is removed.

Figure 13:
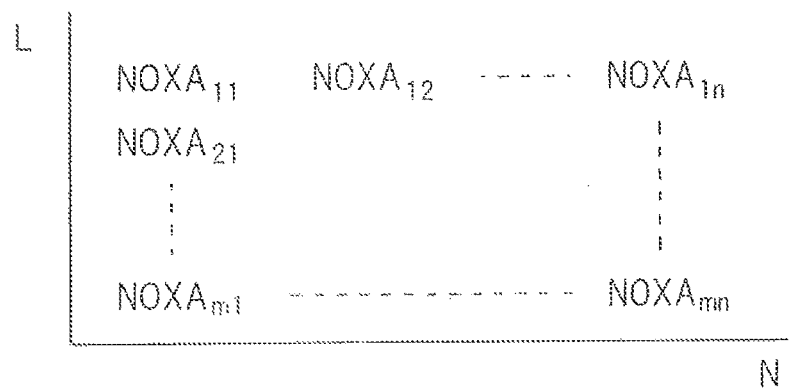
FIG. 13 is a view which shows a map of an exhausted $NO_x$ amount NOXA.

The stored $NO_x$ amount $\Sigma NOX$ is for example calculated from the amount of $NO_x$ which is exhausted from the engine. In this embodiment according to the present invention, the exhausted $NO_x$ amount NOXA which is exhausted from the engine per unit time is stored as a function of the demanded load L and engine speed N in the form of a map such as shown in FIG. 13 in advance in the ROM 32. From, this exhausted $NO_x$ amount NOXA, the stored $NO_x$ amount $\Sigma NOX$ is calculated. In this case, the period by which the air-fuel ratio in the combustion chamber 5 is made rich is usually 1 minute or more.

Figure 14:
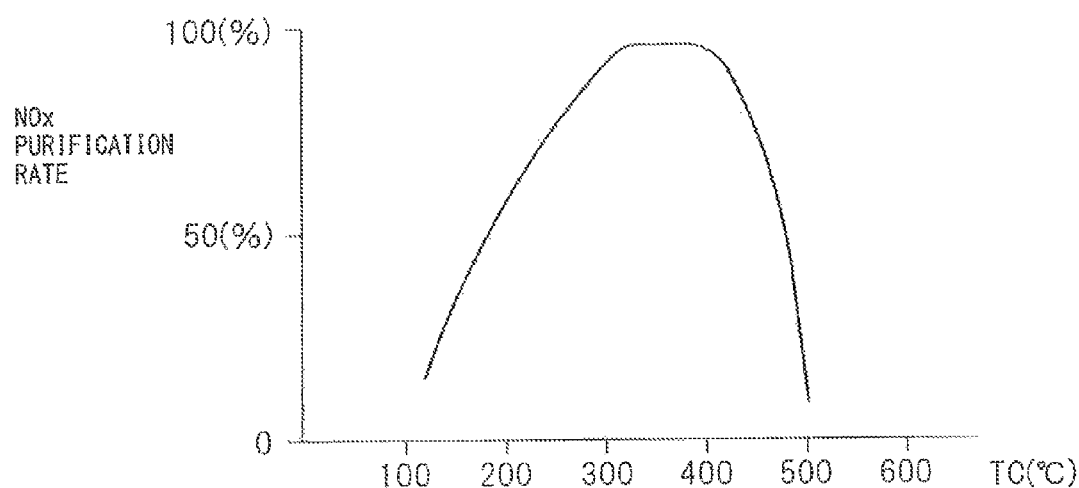
FIG. 14 is a view which shows an $NO_x$ purification rate.

FIG. 14 shows the $NO_x$ purification rate when using the $NO_x$ storage and release action of the $NO_x$ storage catalyst 22 such as shown in FIG. 12 so as to remove the $NO_x$. Note that, in FIG. 14, the abscissa shows the catalyst temperature TC of the exhaust purification catalyst 22. In this case, as will be understood from FIG. 14, when the catalyst temperature TC is 300° C. to 400° C., an extremely high $NO_x$ purification rate is obtained, but if the catalyst temperature TC becomes a 400° C. or higher temperature, the $NO_x$ purification rate falls. If the catalyst temperature TC becomes 400° C. or more in this way, the $NO_x$ purification rate falls since if the catalyst temperature TC becomes 400° C. or more, $NO_x$ becomes harder to store and, further, the nitrates break down under heat and are released in the form of $NO_2$ from the exhaust purification catalyst 22. That is, so long as storing $NO_x$ in the form of nitrates, obtaining a high $NO_x$ purification rate is difficult when the catalyst temperature TC is high.

As opposed to this, the amount of adsorption of NO on the surface of the platinum Pt 61 is not affected much at all by the temperature TC of the exhaust purification catalyst 22. Therefore, if making the $NO_x$ which is contained in the exhaust gas be adsorbed at the surface of the platinum Pt 61 rather than being absorbed in the form of nitrates at the exhaust purification catalyst 22, the $NO_x$ storage amount will not be affected much at all by the temperature TC of the exhaust purification catalyst 22. In this regard, as explained above, a little while after fuel starts to be burned by the lean air-fuel ratio, the action of absorption of $NO_x$ at the exhaust purification catalyst 22 is started. Therefore, if, after fuel starts to be burned by a lean air-fuel ratio and before the action of absorption of $NO_x$ to the exhaust purification catalyst 22 is started, the air-fuel ratio in the combustion chamber 6 is made rich, the $NO_x$ which is contained in the exhaust gas can be removed without the $NO_x$ being absorbed in the exhaust purification catalyst 22.

Figure 15:
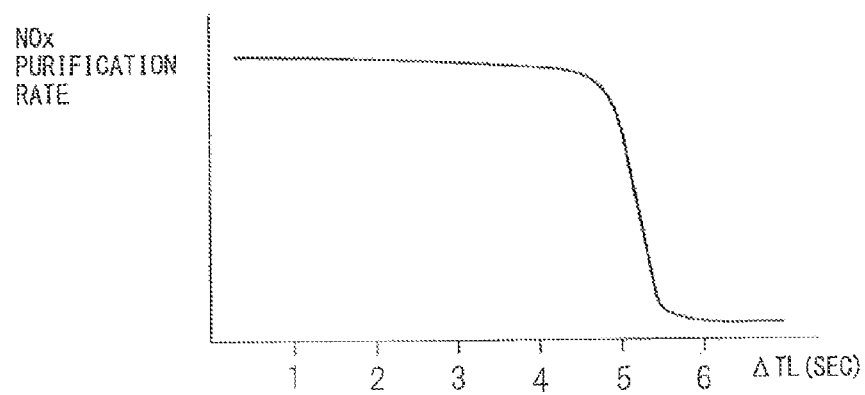
FIG. 15 is a view which shows a relationship between an $NO_x$ purification rate and a switching period of the air-fuel ratio from lean to rich.

In this way, the method of removal of $NO_x$ which makes the air-fuel ratio in the combustion chamber 5 rich after fuel starts to be burned by the lean air-fuel ratio and before the action of absorption of $NO_x$ to the exhaust purification catalyst 22 is started and thereby removes $NO_x$ without allowing $NO_x$ which is contained in the exhaust gas to be absorbed at the exhaust purification catalyst 22 is the $NO_x$ removal method utilizing adsorbed NO which was explained with reference to FIGS. 10A and 10B. In this case, as explained above, if the period $\Delta TL$ (FIG. 5C) at which the air-fuel ratio of the exhaust gas flowing into the exhaust purification catalyst 22 is switched from lean to rich becomes longer, the exhaust purification catalyst 22 starts to absorb $NO_x$ in the form of nitrates. In this case, if the period $\Delta TL$ at which the air-fuel ratio of the exhaust gas flowing into the exhaust purification catalyst 22 is switched from lean to rich becomes longer than about 5 seconds, $NO_x$ starts to be absorbed in the basic layer 63 in the form of nitrates. Therefore as shown in FIG. 15, if the period $\Delta TL$ of switching from lean to rich becomes longer than about 5 seconds, the $NO_x$ purification rate will fall. Therefore, the period $\Delta TL$ of switching from lean to rich has to be made 5 seconds or less. By way of reference, each lean time $\Delta TL$ which is shown in the map of FIG. 8B is made 5 seconds or less.

Figure 16:
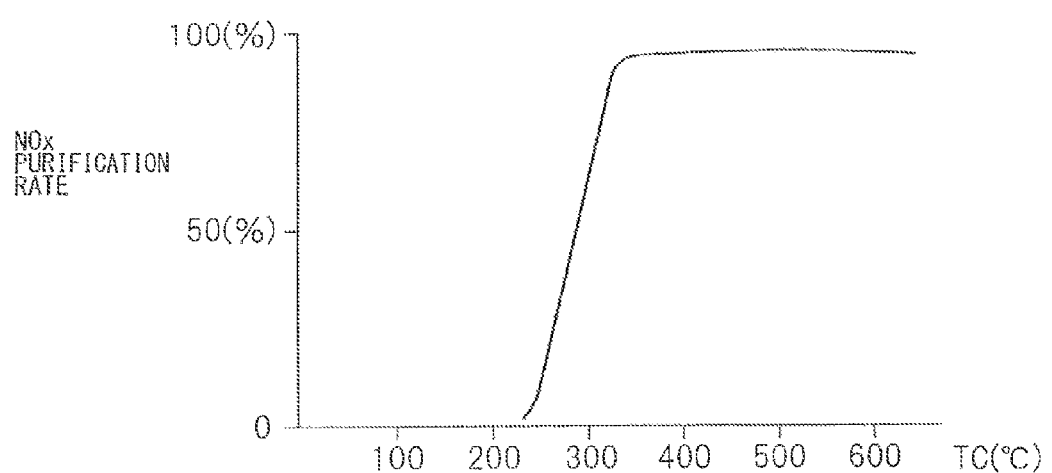
FIG. 16 is a view which shows an $NO_x$ purification rate.

FIG. 16 snows the $NO_x$ purification rate when removing $NO_x$ by the $NO_x$ removal method utilizing adsorbed NO. As shown in FIG. 16, in this case, it is learned that even if the temperature TC of the exhaust purification catalyst 22 becomes high and reaches a high temperature of 400° C. or more, the $NO_x$ purification rate will not fall.

Therefore, if injecting fuel from the fuel injectors 11 and 12 at the time of engine medium load operation in accordance with the fuel injection amount WT calculated from the map which is shown in FIG. 8A and the lean time ΔTL and rich time ΔTR which are calculated from the maps shown in FIGS. 8B and 8C, the $NO_x$ removal action is performed by the $NO_x$ removal method utilizing adsorbed NO. At this time, even if the temperature TC of the exhaust purification catalyst 22 becomes high, a high $NO_x$ purification rate is obtained and the poisoning of the three-way catalyst 20 can be recovered.

In this way, in this embodiment, an exhaust purification catalyst 22 is arranged in the engine exhaust passage downstream of the three-way catalyst 20, a precious metal catalyst 61, 62 is carried on an exhaust gas flow surface of the exhaust purification catalyst 22 and basic exhaust gas flow surface parts are formed around the precious metal catalyst 61, 62, the exhaust purification catalyst 22 has the property of reducing $NO_x$ which is contained in exhaust gas if temporarily switching the air-fuel ratio of the exhaust gas flowing into the exhaust purification catalyst 22 from lean to rich within a predetermined range of period and has the property of being increased in storage amount of $NO_x$ which is contained in the exhaust gas if making the period of switching from lean to rich longer than the predetermined range, and during engine operation, the air-fuel ratio in the combustion chamber 5 is temporarily switched from lean to rich within the predetermined range of period whereby $NO_x$ which is contained in the exhaust gas is removed.

Next, another embodiment where usually the $NO_x$ removal method utilizing the $NO_x$ storage and release action of the exhaust purification catalyst 22 is used and where the $NO_x$ removal method utilizing adsorbed NO is used in accordance with need will be explained. In this case, it is necessary to consider the $NO_x$ absorption ability and NO adsorption ability of the exhaust purification catalyst 22. Therefore, first, the $NO_x$ absorption ability and NO adsorption ability of the exhaust purification catalyst 22 will be explained.

Figure 17A:
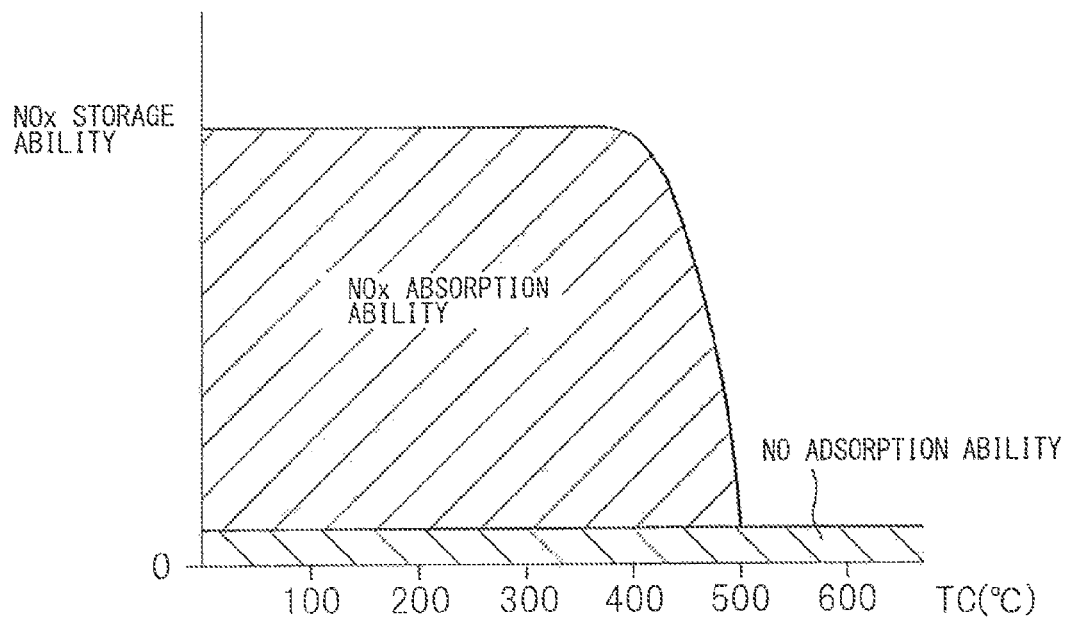
FIGS. 17A and 17B are views for explaining an $NO_x$ absorption ability end NO adsorption ability.

FIG. 17A shows the $NO_x$ absorption ability and the NO adsorption ability in case where $NO_x$ is removed by using the $NO_x$ storage and release action of the exhaust purification catalyst 22 as shown in FIG. 12. Note that, in FIG. 17A, the ordinate shows the sum of the $NO_x$ absorption ability and NO absorption ability, that is, the $NO_x$ storage ability, while the abscissa shows the temperature TC of the exhaust purification catalyst 22. As will be understood from FIG. 17A, when the temperature TC of the exhaust purification catalyst 22 is lower than about 400° C., regardless of the temperature TC of the exhaust purification 22, the $NO_x$ absorption ability and. NO adsorption ability are constant. Therefore, the sum of the $NO_x$ absorption ability and the NO adsorption ability, that is, the $NO_x$ storage ability, also becomes constant regardless of the temperature TC of the exhaust purification catalyst 22.

On the other hand, if the temperature TC of the exhaust purification catalyst 22 becomes higher, the $NO_x$ oxidation reaction ($NO \rightarrow NO_2$) on the surface of the platinum Pt 61 becomes faster. However, if the temperature TC of the exhaust purification catalyst 22 becomes higher, the reaction by which $NO_2$ becomes nitric acid, ions $NO_3^-$ ($NO_2$+Ba $(CO_3)_2 \rightarrow Ba(NO_3)_2 + CO_2$) becomes slower and, as a result, $NO_x$ becomes harder to store at the exhaust purification catalyst 22. Further, if the temperature TC of the exhaust purification catalyst 22 becomes higher, the nitrates break down due to heat and are discharged in the form of $NO_2$ from the exhaust purification catalyst 22. Therefore, as shown in FIG. 17A, if the temperature TC of the exhaust purification catalyst 22 becomes higher and reaches a 400° C. or more high temperature, the $NO_x$ absorption ability rapidly falls. As opposed to this, the amount of adsorption of NO at the surface of the platinum Pt 61 is not affected much at all by the temperature TC of the exhaust purification catalyst 22. Therefore, as shown, in FIG. 17A, the NO adsorption ability does not change much at all even if the temperature TC of the exhaust purification catalyst 22 rises.

Next, while referring to FIGS. 18A and 18B, the relationship between the oxygen concentration of the exhaust gas, the NO adsorption ability, and the $NO_x$ absorption ability when fuel is burned under a lean air-fuel ratio will be explained. First, if considering the adsorption at the surface of the platinum Pt 61, NO and $O_2$ are adsorbed on the surface 61 of the platinum Pt in a competing manner. That is, the larger the amount of NO which is contained in the exhaust gas compared with the amount of $O_2$, the greater the amount of NO which is adsorbed at the surface of the platinum Pt 61 compared with the amount of $O_2$. Conversely, the greater the amount of $O_2$ which is contained in the exhaust gas compared with the amount of NO, the smaller the amount of NO which is adsorbed at the surface of the platinum Pt 61 compared with the amount of $O_2$. Therefore, the NO adsorption ability at the exhaust purification catalyst 22, as shown in FIG. 18A, falls the higher the oxygen concentration of the exhaust gas.

On the other hand, the higher the oxygen concentration of the exhaust gas, the more the oxidation action of the NO in the exhaust gas is promoted and the more the absorption of $NO_x$ in the exhaust purification catalyst 22 is promoted. Therefore, as shown in FIG. 18B, the higher the $NO_x$ absorption ability in the exhaust purification catalyst 22, the higher the oxygen concentration of the exhaust gas. Note that, in FIGS. 18A and 18B, the region X shows the time when fuel is burned under a lean air-fuel ratio in case where $NO_x$ is removed by utilizing the $NO_x$ storage and release action of the exhaust purification catalyst 22 as shown in FIG. 12. At this time, it is learned that the NO adsorption ability is low and the $NO_x$ absorption ability is high. The above-mentioned FIG. 17A shows the NO adsorption ability and the $NO_x$ absorption ability at this time.

Now then, as already explained with reference to FIG. 17A, if the temperature TC of the exhaust purification catalyst 22 becomes higher and reaches a 400° C. or more high temperature, the $NO_x$ absorption ability rapidly falls. As opposed to this, the NO adsorption ability does not change much at all even if the temperature TC of the exhaust purification catalyst 22 becomes high. Therefore, when the temperature TC of the exhaust purification catalyst 22 becomes high and reaches a 400° C. or more high temperature, if ceasing use of the $NO_x$ removal method utilizing the $NO_x$ absorption action and instead using the $NO_x$ removal method utilizing the NO adsorption action, it is guessed that $NO_x$ may be able to be removed. However, as will be understood from FIG. 17A, the NO adsorption ability is low. To utilize the NO adsorption action to remove the $NO_x$ without inviting an increase in the fuel consumption, the NO adsorption ability has to be increased.

Figure 18A:
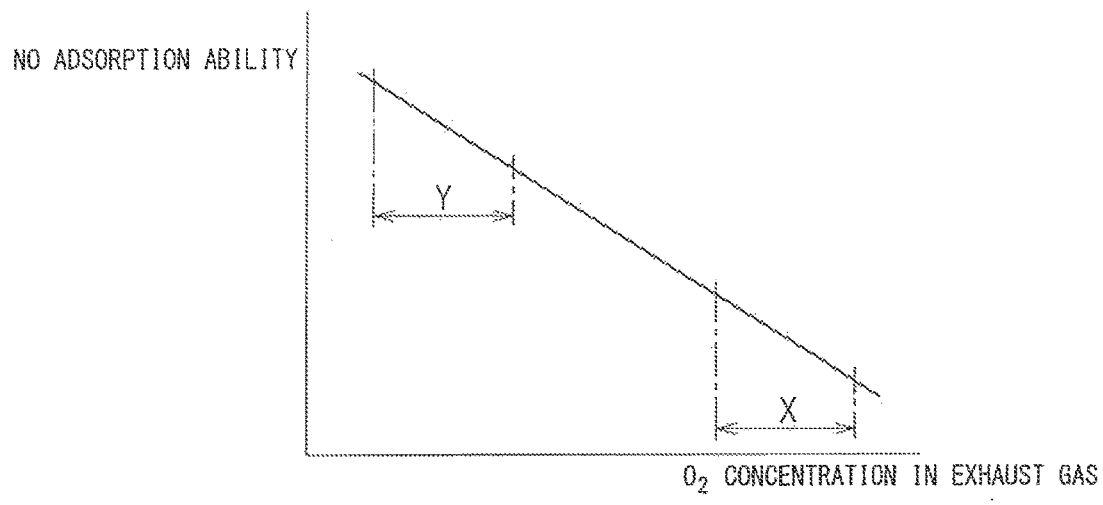
FIGS. 18A and 18B are views for explaining an $NO_x$ absorption ability and NO adsorption ability.

In this case, to make the NO adsorption ability increase, as will be understood from FIG. 18A, it is sufficient to cause the oxygen concentration of the exhaust gas to fall. At this time, as shown in FIG. 18B, the $NO_x$ absorption ability falls.

Figure 17B:
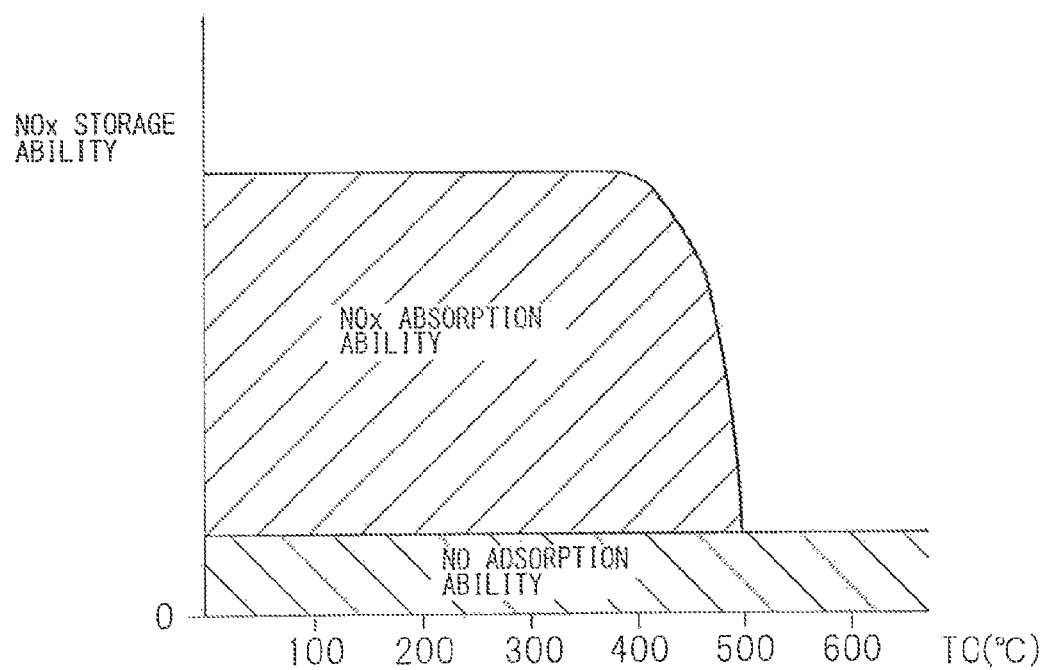
Figure 18B:
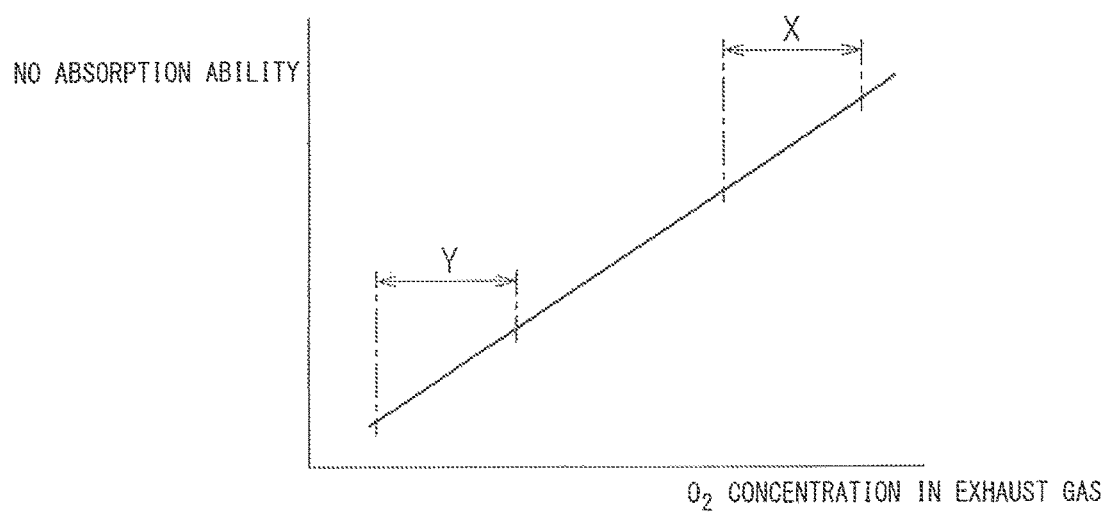

The $NO_x$ absorption ability and NO adsorption ability when making the oxygen concentration of the exhaust gas fall to the region Y in FIGS. 18A and 18B are shown in FIG. 17B. By making the oxygen concentration of the exhaust gas fall, the NO adsorption ability can be made to increase. "Making the oxygen concentration of the exhaust gas fall" means making the air-fuel ratio when fuel is burned under a lean air-fuel ratio (called the "base air-fuel ratio") fall. Therefore, by making the base air-fuel ratio fall, the NO adsorption ability can be made to increase.

Figure 19A:
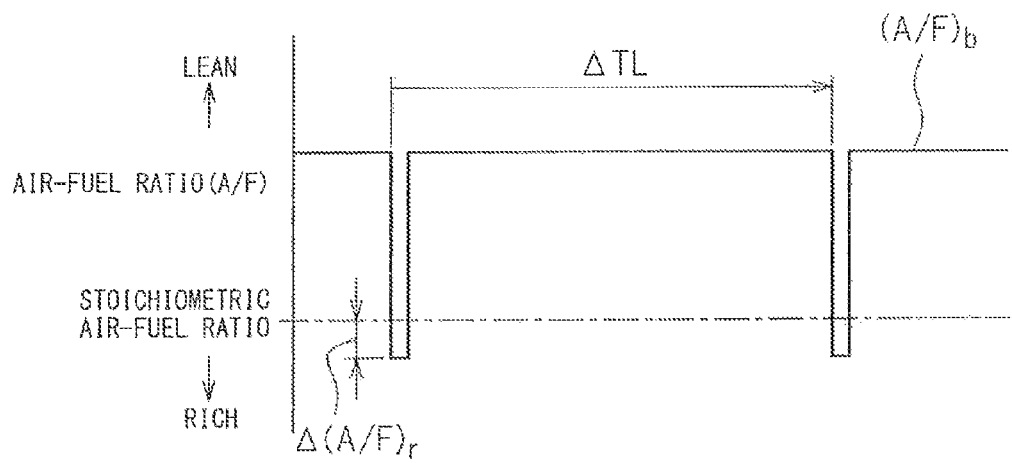
FIGS. 19A, 19B, and 19C are time charts which show changes of an air-fuel ratio of exhaust gas which is exhausted from an engine.
Figure 19B:
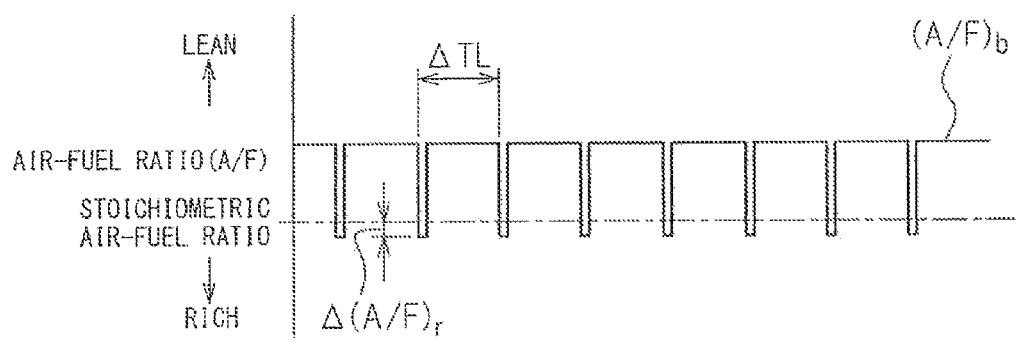

Therefore, in this embodiment, when utilizing the NO adsorption action to remove the $NO_x$, that is, in the $NO_x$ removal method utilizing adsorbed NO, the base air-fuel ratio is made to fall. Next, this will be explained with reference to FIG. 19A to FIG. 19C. FIG. 19A shows she change in the air-fuel ratio (A/F) in the combustion chamber 5 in case where $NO_x$ is removed by utilizing the $NO_x$ storage and release action of the exhaust purification catalyst 22 in the same way as the case which is shown in FIG. 12. Note that, in FIG. 19A, (A/F)b shows the base air-fuel ratio, Δ(A/F)r shows the richness degree of the air-fuel ratio, and ΔTL shows the rich period of the air-fuel ratio at which the air-fuel ratio is switched from lean to rich. On the other hand, FIG. 19B shows the change in the air-fuel ratio (A/F) in the combustion chamber 5 in case where $NO_x$ is removed by utilizing the NO adsorption action. Note that, in FIG. 19B, (A/F)b shows the base air-fuel ratio, Δ(A/F)r shows the richness degree of the air-fuel ratio, and ΔTL shows the rich period of the air-fuel ratio.

Figure 19C:
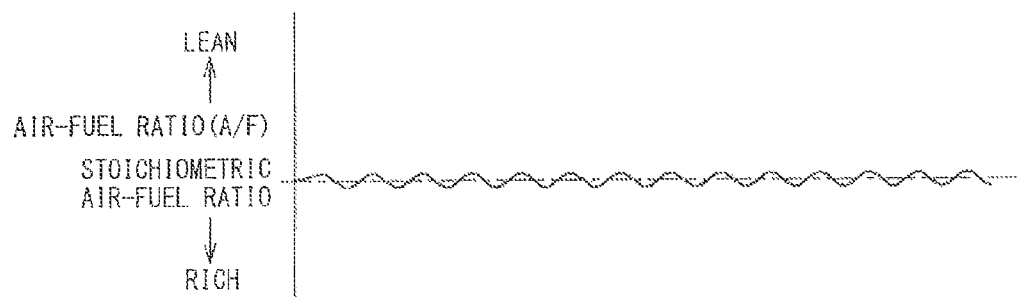

As will be understood if comparing FIG. 19A and FIG. 19B, when utilizing the NO adsorption action to remove $NO_x$ as shown in FIG. 19B, fuel is burned in the combustion chamber 5 under a base air-fuel ratio (A/F)b which is smaller than the base air-fuel ratio (A/F)b in the case of utilizing the $NO_x$ storage and release action of the air-fuel ratio catalyst 22 to remove the $NO_x$ as shown in FIG. 19A and, the air-fuel ratio in the combustion chamber 5 is made rich by a period which is shorter than the rich period ΔTL of the air-fuel ratio for release of $NO_x$ in the case of utilizing the $NO_x$ storage and release action of the the air-fuel ratio catalyst 22 to remove the $NO_x$ as shown in FIG. 19A. On the other hand, FIG. 19C shows the change in the air-fuel ratio in the combustion chamber 5 in case where the air-fuel ratio in the combustion chamber 5 is feedback controlled to the stoichiometric air-fuel ratio.

Figure 20:
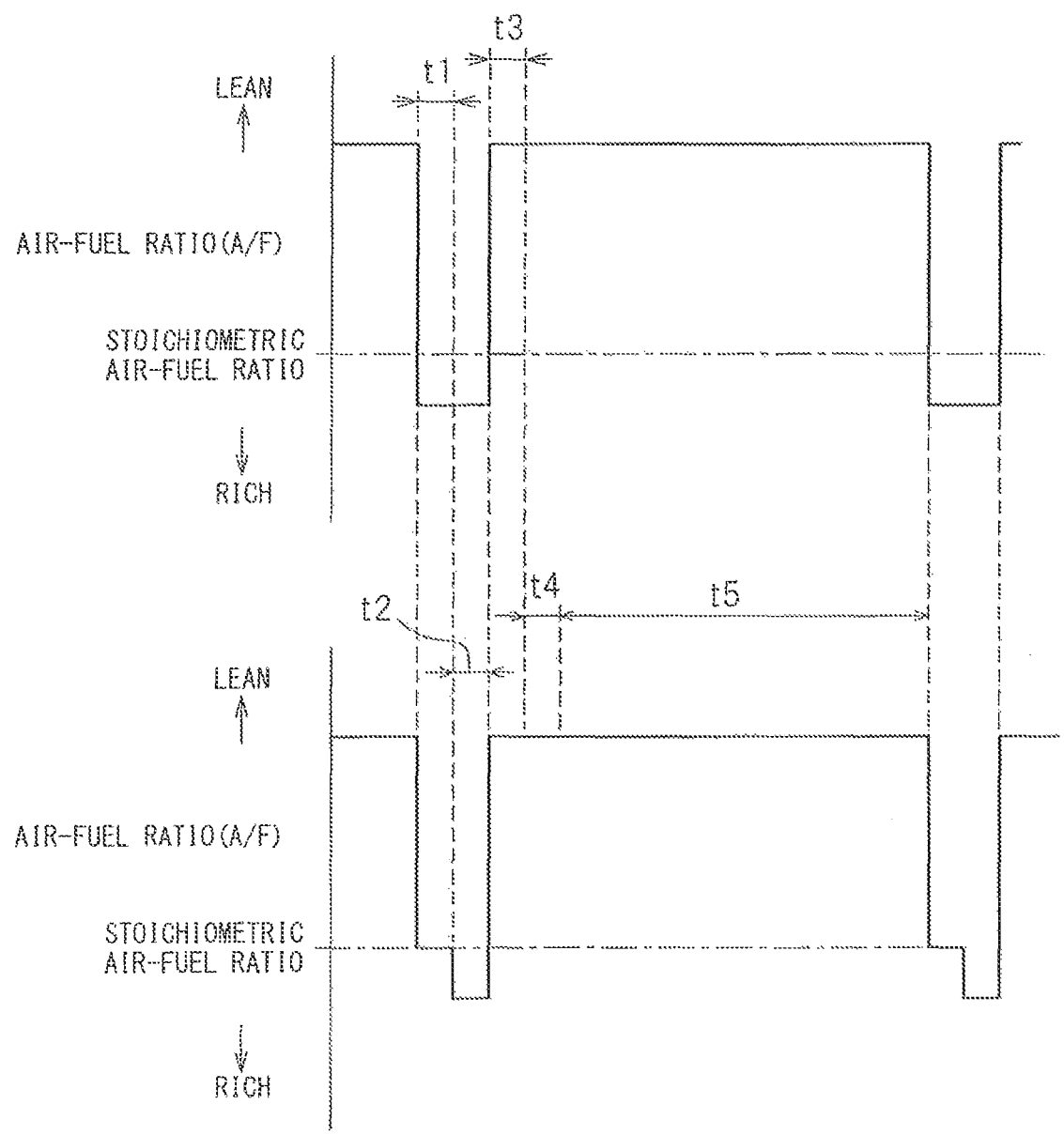
FIG. 20 is a time chart which shows a change of an air-fuel ratio of exhaust gas which flows into a three-way catalyst and exhaust purification catalyst.

FIG. 20 shows the change in the air-fuel ratio (A/F) in the combustion chamber 5 and the change in the air-fuel ratio of the exhaust gas (A/F) which flows into the exhaust purification catalyst 22 in the case of utilizing the NO adsorption action to remove $NO_x$ as shown in FIG. 19B. In this case, if the air-fuel ratio (A/F) in the combustion chamber 5 is made rich, in the three-way catalyst 20, the stored oxygen is released and the air-fuel ratio is maintained at the stoichiometric air-fuel ratio for the time t1. Due to this, HC, CO, and $NO_x$ are simultaneously reduced. During this time, as shown in FIG. 20, the air-fuel ratio of the exhaust gas (A/F) which flows into the exhaust purification catalyst 22 is maintained at the stoichiometric air-fuel ratio. Next, if the stored oxygen of the three-way catalyst 20 is consumed, the air-fuel ratio of the inflowing exhaust gas (A/F) which flows into the exhaust purification catalyst 22 becomes rich for the time t2. At this time, as shown in FIG. 10B, the NO which disassociates and is adsorbed on the surface of the platinum Pt 61 on the one hand becomes $N_2$ and on the other hand becomes the reducing intermediate NCO. This reducing intermediate NCO continues to be held or adsorbed on the surface of the basic layer 63 for a while after being formed.

Next, if the air-fuel ratio (A/F) in the combustion chamber 5 is again returned to t he lean state, this time oxygen is stored in the three-way catalyst 20. At this time, at the catalyst surface of the three-way catalyst 20, the air-fuel, ratio is maintained at the stoichiometric air-fuel ratio for the time t3. Due to this, at this time as well, HC, CO, and $NO_x$ are simultaneously decreased. Next, during the time t4, the $NO_x$ which is contained in the exhaust gas reacts with the reducing intermediate NCO which is held or adsorbed on the surface of the basic layer 63 and is reduced by the reducing intermediate NCO. Next, for the time t5, the NO which is contained in the exhaust gas is disassociated and adsorbed at the surface of the platinum Pt 61 as shown in FIG. 10A.

In this way, when utilizing the NO adsorption action to remove $NO_x$ as shown in FIG. 19B, two removal actions are performed: the action of removal of $NO_x$ by utilizing the NO adsorption action and the action of removal of $NO_x$ by utilizing the oxygen storage ability at the three-way catalyst 20.

Next, a summary of the engine operating control will be explained. In this embodiment, as shown in FIG. 20, an engine low load operating region I at the engine low load operating side, an engine high load operating region III at the engine high load operating side, and an engine medium load operating region II which is positioned between the engine low load operating region I and the engine high load operating region III are set in advance. Note that, in FIG. 21, the ordinate L shows the required load, while the abscissa N shows the engine speed. In this case, in the engine low load operating region I, as shown in FIG. 19A, an $NO_x$ removal action designed to utilize the $NO_x$ storage and release action of the exhaust purification catalyst 22 to remove the $NO_x$ is performed, while in the engine medium load operating region II, as shown, in FIG. 19B, an $NO_x$ removal action designed to utilize the NO adsorption action to remove the $NO_x$ is performed. Note that, in the engine high load operating region III, as shown in FIG. 19C, the air-fuel ratio in the combustion chamber 5 is feedback controlled to the stoichiometric air-fuel ratio.

That is, in the embodiment according to the present invention, in the predetermined engine low load operating region I, fuel is burned in the combustion chamber 5 under a lean base air-fuel ratio and, when $NO_x$ should be released from the exhaust purification catalyst 22, the air-fuel ratio in the combustion chamber 5 is made rich. In the predetermined engine high load operating region III, the air-fuel ratio in the combustion chamber 5 is feedback controlled to the stoichiometric air-fuel ratio, while in the predetermined engine medium load operating region II, fuel is burned in the combustion chamber 5 under a base air-fuel ratio smaller than the base air-fuel ratio in the engine low load operating region I and the air-fuel ratio in the combustion chamber 5 is made rich by a shorter period than the rich period of the air-fuel ratio for releasing $NO_x$ in the engine low load operating region I.

Note that, as will be understood from FIG. 19A to FIG. 19C, the base air-fuel ratio in the engine medium load operating region II is an intermediate value between the base air-fuel ratio in the engine low load operating region I and the stoichiometric air-fuel ratio. The degree of richness of the air-fuel ratio when the air-fuel ratio in the combustion chamber 5 is made rich in the engine medium load operating region II is smaller than the degree of richness of the air-fuel ratio when the air-fuel ratio in the combustion chamber 5 is made rich in the engine low load operating region I.

Figure 22:
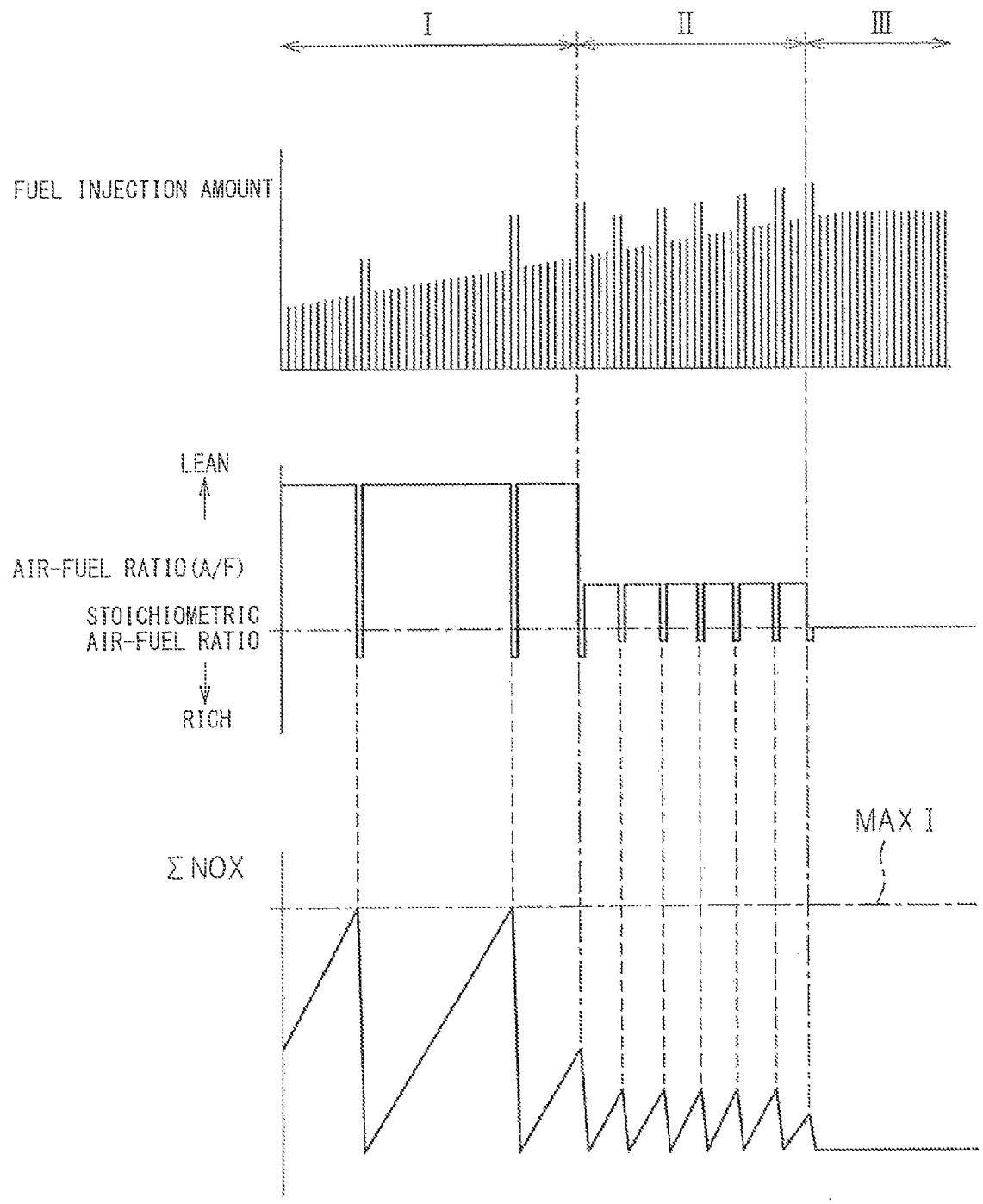
FIG. 22 is a time chart which shows changes of a fuel injection amount etc. at the time of engine operation.

Next, referring to FIG. 22 which shows when the operation shifts from low load operation to high load operation, the $NO_x$ removal method will be explained. Note that, FIG. 22 shows the change in fuel injection amount to the inside of the combustion chamber 5, the change of the air-fuel ratio (A/F) in the combustion chamber 5, and the change of the stored $NO_x$ amount $\Sigma NOX$. Further, in FIG. 22, MAXI shows the allowable $NO_x$ storage amount.

Now then, in FIG. 22, in the engine low load operating region I, if the stored $NO_x$ amount $\Sigma NOX$ exceeds the allowable $NO_x$ storage amount MAXI, the air-fuel ratio in the combustion chamber 5 is made temporarily rich. On the other hand, if, in the state where the exhaust, purification catalyst 22 stores $NO_x$, the $NO_x$ removal method utilizing the NO adsorption action which is shown in FIG. 19B is switched to, right after $NO_x$ removal, utilizing the NO adsorption action is switched to, part of the $NO_x$ which is stored in the exhaust purification catalyst 22 is released without being reduced. Therefore, in this embodiment according to the present invention, as shown in FIG. 22, when the engine operating state shifts from the engine low load operating region I to the engine medium load operating region II, the air-fuel ratio (A/F) in the combustion chamber 5 is made temporarily rich.

In the engine medium load operating region II, as shown in FIG. 22, each time the lean time $\Delta TL$ elapses, the air-fuel ratio in she combustion chamber 5 is made temporarily rich. At this time, the action or removal of $NO_x$ utilizing the adsorbed NO is performed and the poisoning of the three-way catalyst 20 is recovered. On the other hand, if, in the state where the exhaust purification catalyst 22 stores $NO_x$, the $NO_x$ removal method using feedback control to the stoichiometric air-fuel ratio which is shown in FIG. 19C is switched to, right after the $NO_x$ removal method using feedback control to the stoichiometric air-fuel ratio is switched to, part of the $NO_x$ which is stored in the exhaust purification catalyst 22 is released without being reduced. Therefore, in this embodiment according to the present invention, as shown in FIG. 22, when the engine operating state shifts from, the engine medium load operating region II to the engine high load operating region III, the air-fuel ratio (A/F) in the combustion chamber 5 is made temporarily rich.

In the engine high load operating region III, the feedback control of the amounts of injection from the fuel injectors 11 and 12 is performed based on the output signal of the air-fuel ratio sensor 27 so that the oxygen steerage amount of the three-way catalyst 20 becomes an intermediate value between zero and the maximum oxygen storage amount. At this time, the air-fuel ratio in the combustion chamber 5 is controlled to the stoichiometric air-fuel ratio, therefore the harmful ingredients HC, CO, and $NO_x$ which are contained in the exhaust gas are simultaneously removed at the three-way catalyst 20.

Now, as shown in FIG. 22, if the air-fuel ratio is made rich, at this time, ammonia is sometimes produced. However, in this embodiment according to the present invention, this ammonia is adsorbed at the $NO_x$ selective reduction catalyst 23. The ammonia which is adsorbed at this $NO_x$ selective reduction catalyst 23 reacts with the $NO_x$ which is contained in the exhaust gas and is used for reducing the $NO_x$.

Figure 21:
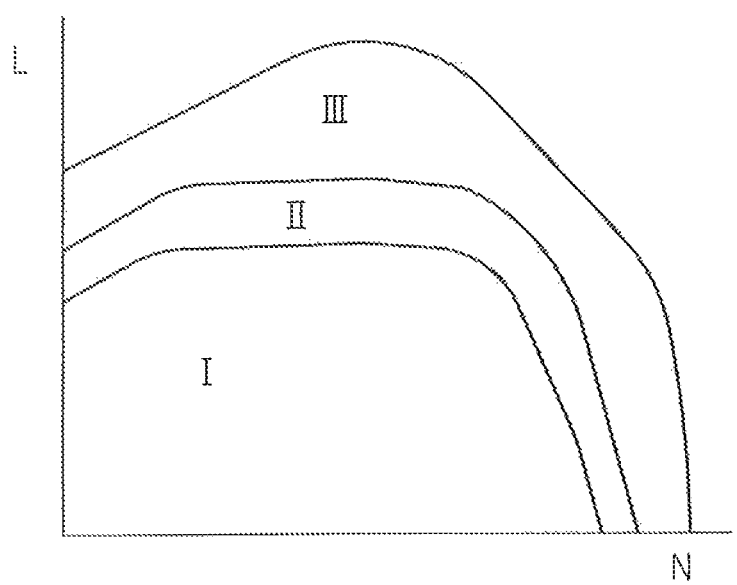
FIG. 21 is a view which shows engine operating regions.
Figure 23:
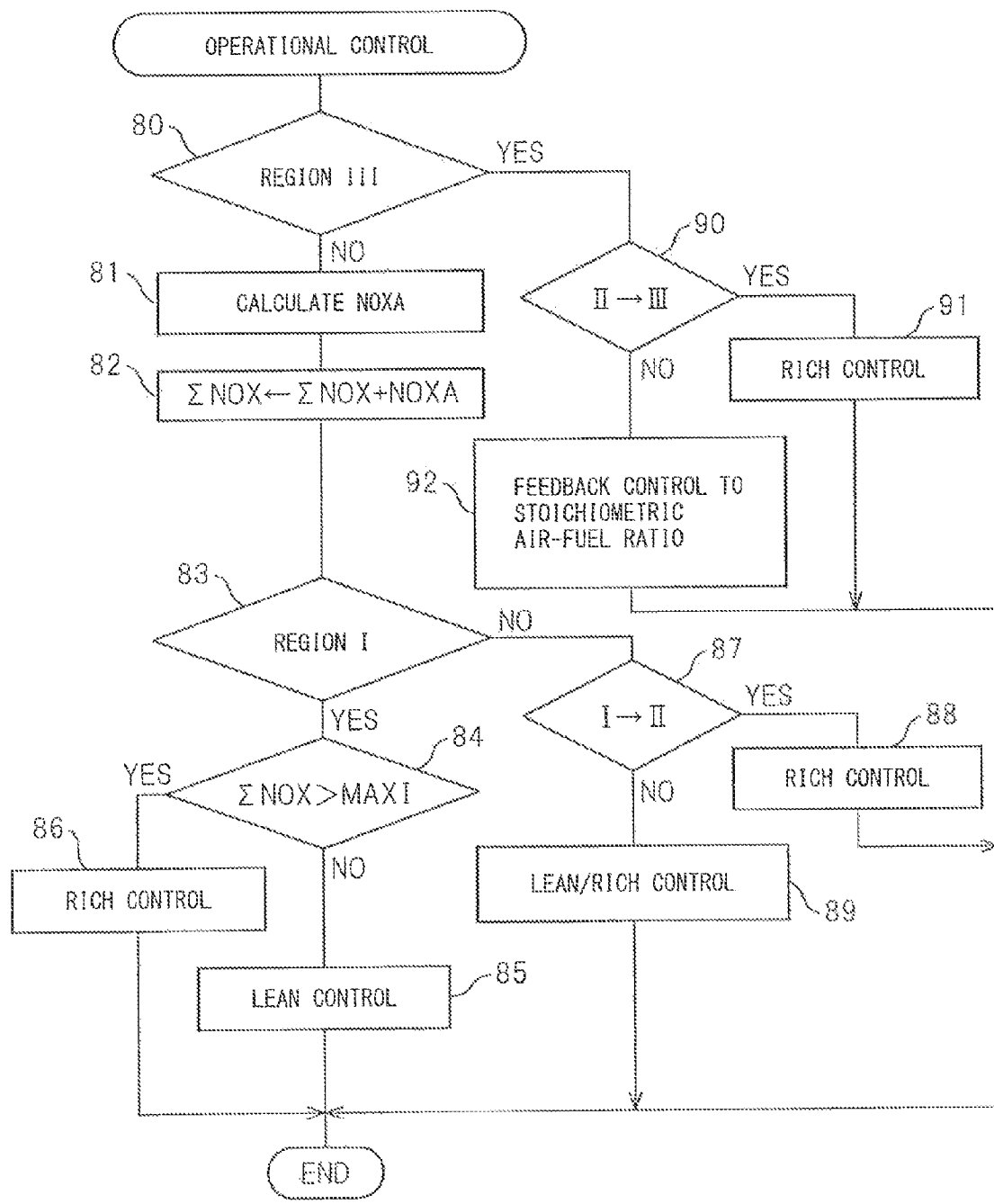
FIG. 23 is a flow chart for performing an engine operation control.

FIG. 23 shows an operational control routine. This routine is executed by interruption every fixed time period. Referring to FIG. 23, first, at step 80, it is judged if the engine operating state is the engine high load operating region III which is shown in FIG. 21. When the engine operating state is not the engine high load operating region III, the routine proceeds to step 81 where the $NO_x$ amount NOXA exhausted per unit time is calculated from the map which is shown in FIG. 13. Next, at step 82, the stored $NO_x$ amount $\Sigma NOX$ is calculated by adding the exhausted $NO_x$ amount NOXA to $\Sigma NOX$. Next, at step 83, it is judged if the engine operating state is the engine low load operating region I which is shown in FIG. 21. When the engine operating state is the engine low load operating region I which is shown in FIG. 21, the routine proceeds to step 84.

At step 84, it is judged if the $NO_x$ storage amount $\Sigma NOX$ exceeds the allowable $NO_x$ storage amount MAXI. When the $NO_x$ storage amount $\Sigma NOX$ does not exceed the allowable $NO_x$ storage amount MAXI, the routine proceeds to step 85 where the air-fuel ratio in the combustion chamber 5 is made a lean air-fuel ratio which is predetermined in accordance with the engine operating state. At this time, the fuel is burned under a lean base air-fuel ratio. As opposed to this, when it is judged at step 84 that the $NO_x$ storage amount $\Sigma NOX$ exceeds the allowable $NO_x$ storage amount MAXI, the routine proceeds to step 86 where the air-fuel ratio in the combustion chamber 5 is made temporarily rich and $\Sigma NOX$ is cleared. At this time, the $NO_x$ which had been stored at the exhaust purification catalyst 22 is released from the exhaust purification catalyst 22.

On the other hand, when, at step 83, it is judged that the engine operating state is not the engine low load operating region I which is shown in FIG. 21, that is, when it is judged that the engine operating state is the engine medium load operating region II which is shown in FIG. 21, the routine proceeds to step 87 where it is judged if the engine operating state has now shifted from the engine low load operating region I to the engine medium load operating region II. When the engine operating state has now shifted from the engine low load operating region I to the engine medium load operating region II, the routine proceeds to step 88 where the air-fuel ratio in the combustion chamber 5 is temporarily made rich. As opposed to this, when the engine operating state has already shifted from the engine low load operating region I to the engine medium load operating region II, the routine proceeds to step 89. At step 89, the fuel injection amount WT, lean time $\Delta TL$, and rich time $\Delta TR$ are calculated from FIGS. 8A, 8B, and 8C, respectively, and the lean/rich control by which recovery of poisoning which is shown in FIG. 5C becomes possible is performed based on these fuel injection amount WT, lean time $\Delta TL$, and rich time $\Delta TR$. At this time, the $NO_x$ removal action utilizing adsorption of NO is performed.

On the other hand, when it is judged at step 80 that the engine operating state is the engine high load operating region III which is shown in FIG. 21, the routine proceeds to step 90 where it is judged if the engine operating state has now shifted from the engine medium load operating region II to the engine nigh load operating region III. When the engine operating state has now shifted from the engine medium load operating region II to the engine high load operating region III, the routine proceeds to step 91 where the air-fuel ratio in the combustion chamber 5 is made temporarily rich. As opposed to this, when the engine operating state is already shitting from the engine medium load operating region II to the engine high load operating region III, the routine proceeds to step 92. At step 92, the air-fuel ratio in the combustion chamber 5 is feedback controlled to the stoichiometric air-fuel ratio.

REFERENCE SIGNS LIST 5 combustion chamber
6 spark plug 11, 12 fuel injector
14 surge tank
19 exhaust manifold
20 three-way catalyst
22 exhaust purification catalyst

The invention claimed is:

1. An exhaust purification system of a spark ignition type internal combustion engine, comprising:
   a three-way catalyst having an oxygen storage function arranged in an engine exhaust passage, wherein an air-fuel ratio in a combustion chamber is feedback controlled to a stoichiometric air-fuel ratio so that an oxygen storage amount of said three-way catalyst becomes a value between zero and a maximum oxygen storage amount to simultaneously remove HC, CO, and $NO_x$ which are contained in an exhaust gas at said three-way catalyst; and
   an electronic control unit,
   wherein when an engine operating state is one where if the air-fuel ratio in the combustion chamber were feedback controlled to the stoichiometric air-fuel ratio, an amount of poisoning of a precious metal catalyst carried on the three-way catalyst gradually increases, the electronic control unit is configured to cause an increase in a degree of leanness of the air-fuel ratio in the combustion chamber compared with when said air-fuel ratio is feedback controlled to the stoichiometric air-fuel ratio so that an oxygen storage amount of the three-way catalyst increases to a maximum oxygen storage amount and,
   wherein even after the oxygen storage amount of the three-way catalyst reaches the maximum oxygen storage amount, the electronic control unit is configured to cause the air-fuel ratio in the combustion chamber to be maintained lean and then to be returned to rich,
   wherein the electronic control unit is configured to make longer a time during which the air-fuel ratio in the combustion chamber is maintained lean when there is a greater amount of poisoning of the precious metal catalyst which occurs when the air-fuel ratio in the combustion chamber is rich,
   wherein even after the oxygen storage amount of the three-way catalyst reaches zero, the electronic control unit is configured to cause the air-fuel ratio in the combustion chamber to be maintained rich, and then to be returned to lean, and
   wherein the longer the time during which the air-fuel ratio in the combustion chamber is maintained lean, the longer the time during which the air-fuel ratio in the combustion chamber is made rich.

2. The exhaust purification system of a spark ignition type internal combustion engine as claimed in claim 1, wherein the electronic control unit is configured to make longer the time during which the air-fuel ratio in the combustion chamber is maintained lean when an engine load is high.

3. The exhaust purification system of a spark ignition type internal combustion engine as claimed in claim 2, wherein the electronic control unit is configured to make shorter the time during which the air-fuel ratio in the combustion chamber is maintained lean when a temperature of the three-way catalyst is higher.

4. The exhaust purification system of a spark ignition type internal combustion engine as claimed in claim 1, wherein an engine operating state where the amount of poisoning of the precious metal catalyst gradually increases is an engine medium load operating state.

5. The exhaust purification system of a spark ignition type internal combustion engine as claimed in claim 1, further comprising:
   an exhaust purification catalyst arranged in the engine exhaust passage downstream of said three-way catalyst;
   a precious metal catalyst carried on an exhaust gas flow surface of said exhaust purification catalyst and basic exhaust gas flow surface parts formed around said precious metal catalyst, wherein said exhaust purification catalyst has a property of reducing $NO_x$ contained in exhaust gas when temporarily switching the air-fuel ratio of the exhaust gas flowing into the exhaust purification catalyst from lean to rich within a predetermined range of period and has a property of increasing a storage amount of $NO_x$ contained in the exhaust gas when making a period of switching from lean to rich longer than said predetermined range of period, and
   wherein $NO_x$ contained in the exhaust gas is removed in said exhaust purification catalyst during engine operation when the air-fuel ratio in the combustion chamber is temporarily switched from lean to rich within said predetermined range of period.

6. The exhaust purification system of a spark ignition type internal combustion engine as claimed in claim 5, wherein engine operating regions are comprised of a predetermined engine low load operating region at an engine low load operation side, a predetermined engine high load operating region at an engine high load operation side, and a predetermined engine medium load operating region which is positioned between said engine low load operating region and said engine high load operating region,
   in said predetermined engine low load operating region, fuel is burned in the combustion chamber under a lean base air-fuel ratio and when $NO_x$ should be released from the exhaust purification catalyst, the air-fuel ratio in the combustion chamber is made rich,
   in said predetermined engine high load operating region, the air-fuel ratio in the combustion chamber is feedback controlled to the stoichiometric air-fuel ratio, and
   in said predetermined engine medium load operating region, fuel is burned in the combustion chamber under a smaller base air-fuel ratio than the base air-fuel ratio in said engine low load operating region and the air-fuel ratio in the combustion chamber is made rich by a shorter period than a rich period of the air-fuel ratio for release $NO_x$ in said engine low load operating region.

7. The exhaust purification system of a spark ignition type internal combustion engine as claimed in claim 5, wherein a catalyst carrier of the exhaust purification catalyst carries a precious metal catalyst and is formed with a basic layer which includes at least one element selected from an alkali metal including at least one of potassium K, sodium Na, and cesium Cs, an alkali earth metal including at least one of barium Ba and calcium Ca, a rare earth including a lanthanide, or a metal which can donate electrons to $NO_x$ including at least one of silver Ag, copper Cu, iron Fe, and iridium Ir.

8. The exhaust purification system of a spark ignition type internal combustion engine as claimed in claim 1, wherein when the amount of poisoning of the precious metal catalyst increases and exceeds a predetermined allowable amount, the electronic control unit is configured to cause the increase in the degree of leanness of the air-fuel ratio in the combustion chamber compared with when said air-fuel ratio is feedback controlled to the stoichiometric air-fuel ratio so that the oxygen storage amount of the three-way catalyst increases to the maximum oxygen storage amount.

* * * * *